United States Patent
Teyeb et al.

(10) Patent No.: US 10,959,276 B2
(45) Date of Patent: Mar. 23, 2021

(54) METHODS RESPONDING TO SCG FAILURE IN DC COMMUNICATIONS AND RELATED WIRELESS TERMINALS AND NETWORK NODES

(71) Applicant: Telefonaktiebolaget LM Ericsson (publ), Stockholm (SE)

(72) Inventors: Oumer Teyeb, Solna (SE); Antonino Orsino, Masala (FI); Osman Nuri Can Yilmaz, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 430 days.

(21) Appl. No.: 16/088,173

(22) PCT Filed: Jun. 20, 2018

(86) PCT No.: PCT/SE2018/050658
§ 371 (c)(1),
(2) Date: Sep. 25, 2018

(87) PCT Pub. No.: WO2019/032002
PCT Pub. Date: Feb. 14, 2019

(65) Prior Publication Data
US 2020/0305213 A1    Sep. 24, 2020

Related U.S. Application Data

(60) Provisional application No. 62/543,537, filed on Aug. 10, 2017.

(51) Int. Cl.
*H04W 76/18*    (2018.01)
*H04W 76/15*    (2018.01)
(Continued)

(52) U.S. Cl.
CPC ....... *H04W 76/18* (2018.02); *H04W 72/1242* (2013.01); *H04W 72/14* (2013.01); *H04W 76/15* (2018.02); *H04W 84/18* (2013.01)

(58) Field of Classification Search
None
See application file for complete search history.

(56) References Cited

U.S. PATENT DOCUMENTS

| 2016/0044743 | A1* | 2/2016 | Xu | H04W 76/34 |
| | | | | 370/329 |
| 2016/0057800 | A1* | 2/2016 | Ingale | H04W 76/18 |
| | | | | 370/216 |

(Continued)

FOREIGN PATENT DOCUMENTS

EP    3142452 A1    3/2017

OTHER PUBLICATIONS

3GPP TSG-RAN WG2 NR Adhoc #2, R2-1706857, "Further considerations for SCG SRB and RLF handling", Jun. 27-29, 2017, Nokia, Alcatel-Lucent Shanghai Bell, Qingdao, China (Year: 2017).*

(Continued)

*Primary Examiner* — Chi H Pham
*Assistant Examiner* — Vladislav Y Agureyev
(74) *Attorney, Agent, or Firm* — Sage Patent Group

(57) ABSTRACT

According to a first exemplary embodiment, a wireless terminal may provide DC communication through an MN using an MCG over a first radio interface between the wireless terminal and the MN and through a SN using a SCG over a second radio interface between the wireless terminal and the SN. A split SRB may be configured for the wireless terminal using DC through the MCG with the MN and through the SCG with the SN and the wireless terminal may be configured to use the SCG for the split SRB without using the MCG for the split SRB. Responsive to detecting failure (Continued)

of the SCG while configured to use the SCG for the split SRB without using the MCG for the split SRB, an SCG failure information message regarding failure of the SCG may be transmitted to the master node using the MCG.

22 Claims, 8 Drawing Sheets

(51) Int. Cl.
*H04W 72/12* (2009.01)
*H04W 72/14* (2009.01)
*H04W 84/18* (2009.01)

(56) References Cited

U.S. PATENT DOCUMENTS

| | | | |
|---|---|---|---|
| 2016/0192249 A1* | 6/2016 | Wu | H04W 36/0072 370/331 |
| 2016/0212753 A1* | 7/2016 | Wu | H04W 72/085 |
| 2018/0049214 A1* | 2/2018 | Kubota | H04W 36/32 |
| 2018/0124612 A1* | 5/2018 | Babaei | H04W 16/14 |
| 2018/0160339 A1* | 6/2018 | Wu | H04L 5/001 |
| 2018/0270682 A1* | 9/2018 | Zacharias | H04W 74/0833 |
| 2018/0279406 A1* | 9/2018 | Agarwal | H04W 76/27 |
| 2019/0159274 A1* | 5/2019 | Hong | H04W 76/15 |
| 2019/0342148 A1* | 11/2019 | Hong | H04W 76/15 |
| 2020/0008255 A1* | 1/2020 | Sharma | H04W 12/0431 |
| 2020/0015142 A1* | 1/2020 | Jia | H04W 36/305 |
| 2020/0374960 A1* | 11/2020 | Deenoo | H04W 72/14 |

OTHER PUBLICATIONS

International Search Report and Written Opinion of the International Searching Authority, PCT/SE2018/050658, dated Aug. 31, 2018, 13 pages.
"SCG Failure Handling for Split Bearer," Qualcomm Incorporated, 3GPP TSG-RAN WG2 Meeting #102, Busan, South Korea, May 21-25, 2018, R2-1808174 (Resubmission of R2-1803405) Agenda Item 10.4.1.5.2, WID/SID: NR_newRAT-Core-Release 15, 4 pages.
3rd Generation Partnership Project; Technical Specification Group Radio Access Network; Evolved Universal Terrestrial Radio Access (E-UTRA); Medium Access Control (MAC) protocol specification (Release 14) 3GPP TS 36.321, V14.3.0 (Jun. 2017) 107 pages.
3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14) 3GPP TS 36.300 V14.3.0 (Jun. 2017) 331 pages.
"RRC message transmission for LTE NR tight interworking," Huawei, HiSilicon, 3GPP TSG-RAN WG2 Meeting AH, Spokane, Washington, USA, Jan. 17-19, 2017, R2-1700300, Agenda Item 3.2.2.5, 2 pages.
"Control plane signalling transport for LTE-NR tight interworking," ITRI, 3GPP TSG-RAN WG2 Meeting #97, Athens, Greece, Feb. 13-17, 2017, Tdoc R2-1701344, Agenda Item 10.2.2.5, 3 pages.

* cited by examiner

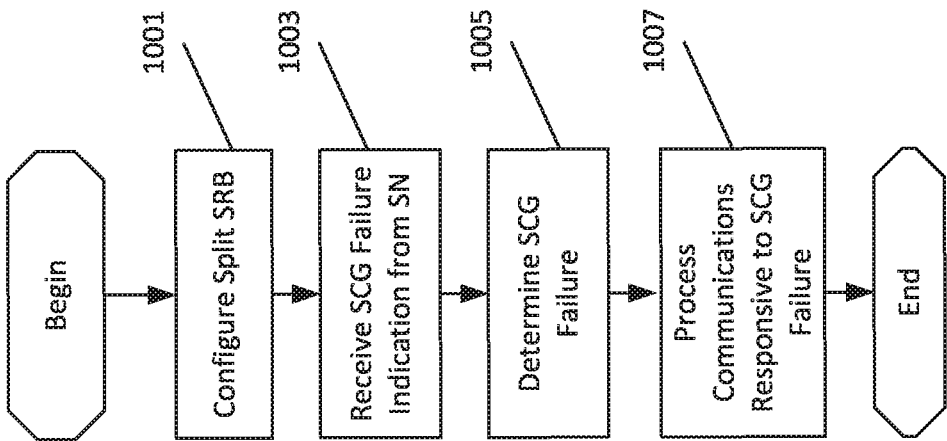
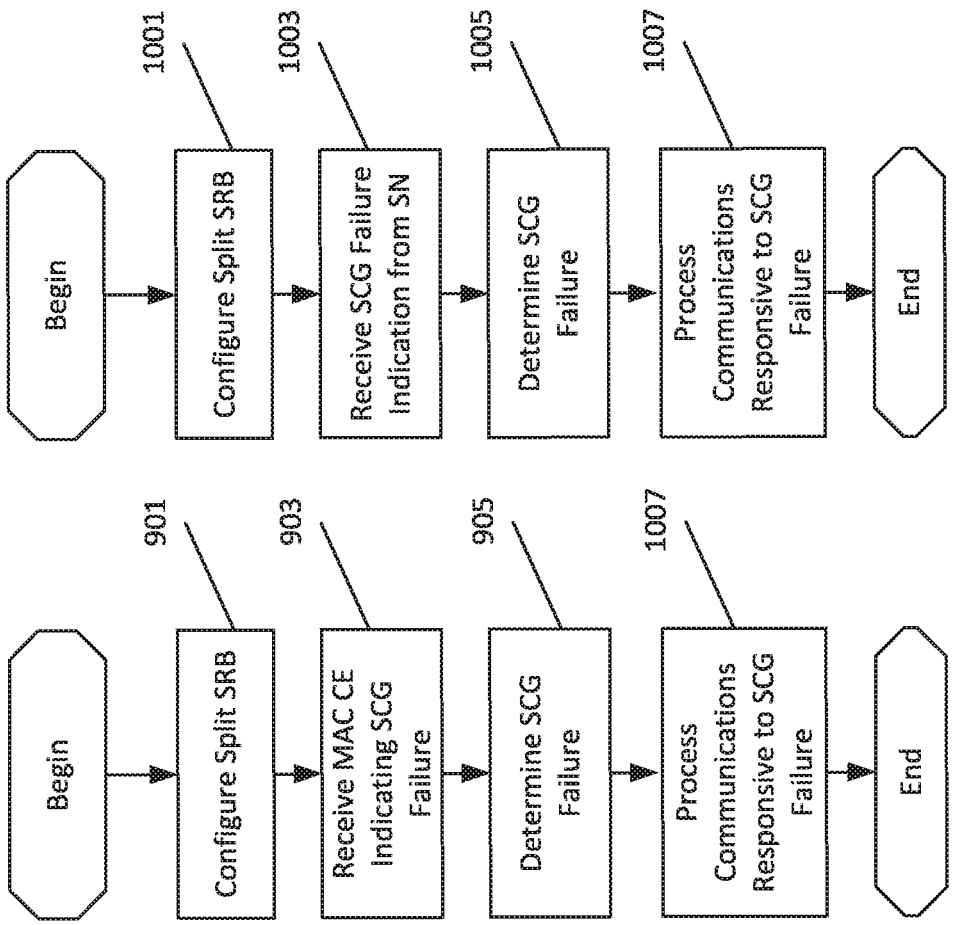
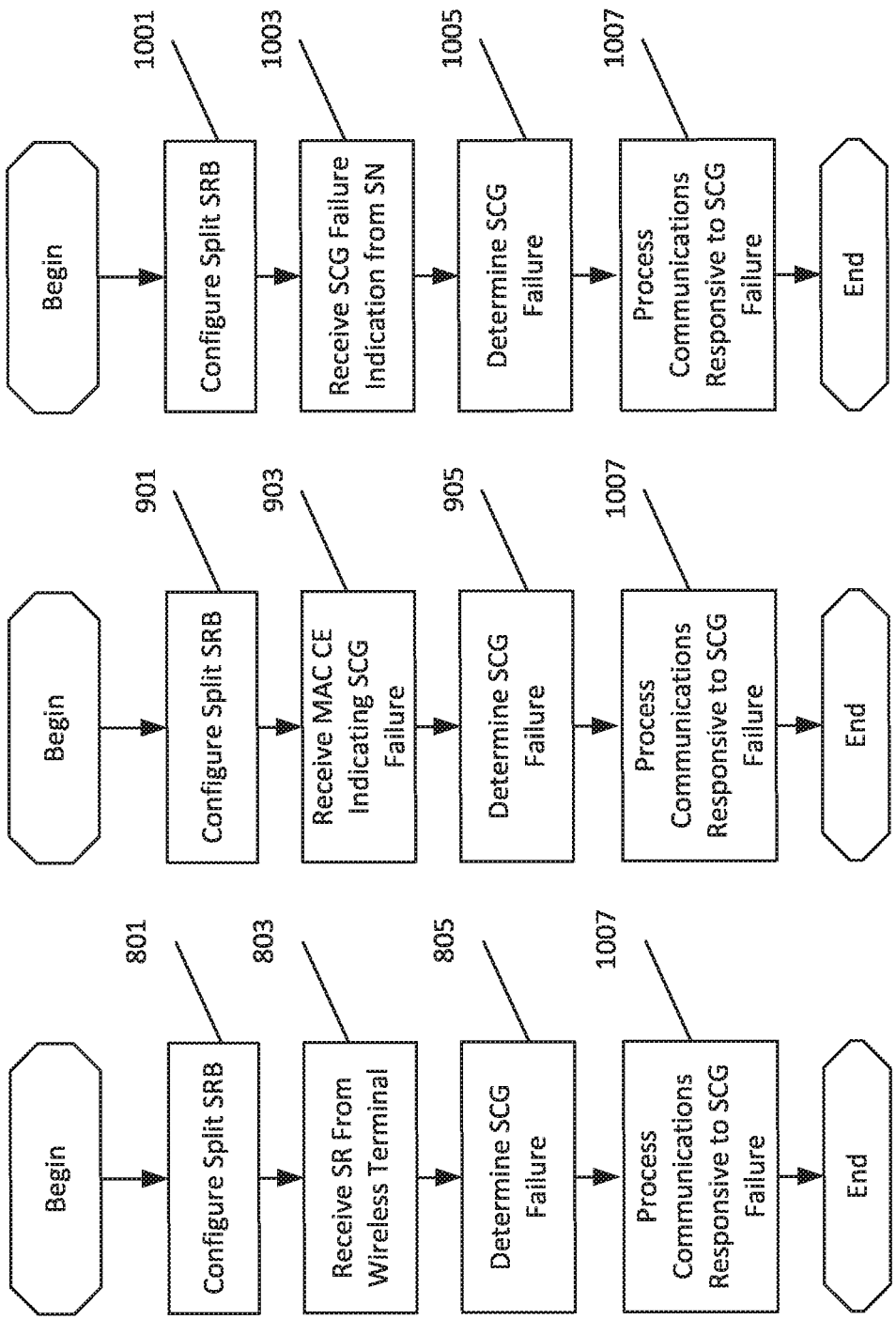

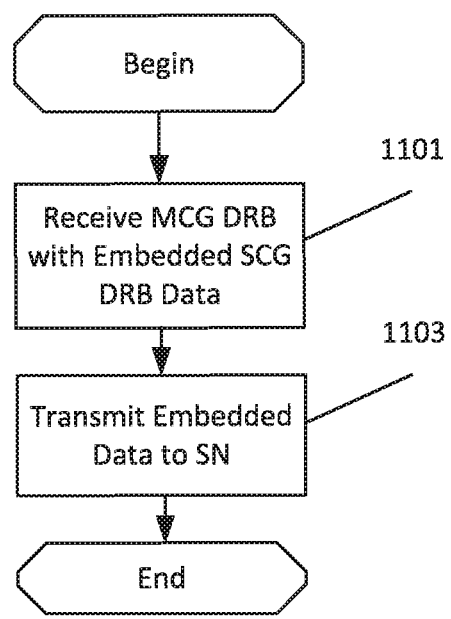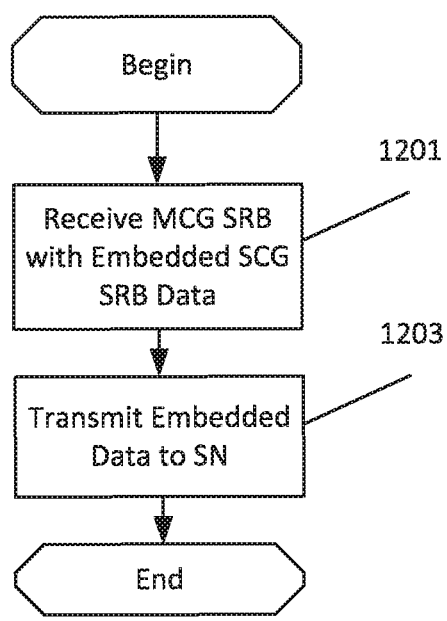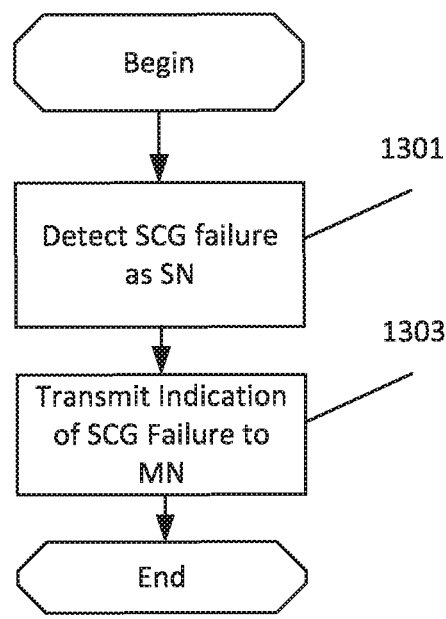

METHODS RESPONDING TO SCG FAILURE IN DC COMMUNICATIONS AND RELATED WIRELESS TERMINALS AND NETWORK NODES

CROSS REFERENCE TO RELATED APPLICATIONS

This application is a 35 U.S.C. § 371 national stage application of PCT International Application No. PCT/SE2018/050658 filed on Jun. 20, 2018, which in turns claims domestic priority to U.S. Provisional Patent Application No. 62/543,537, filed on Aug. 10, 2017, the disclosures and content of which are incorporated by reference herein in their entirety.

TECHNICAL FIELD

The present disclosure relates to communications, and more particularly to wireless communications and related methods and base stations.

BACKGROUND

E-UTRAN supports Dual Connectivity (DC) operation whereby a multiple Rx/Tx UE (User Equipment) in RRC_CONNECTED is configured to use radio resources provided by two distinct schedulers, located in two eNBs connected via a non-ideal backhaul over the X2 interface (see 3GPP 36.300). eNBs involved in DC for a certain UE may assume two different roles. An eNB may either act as an MN (Master node) or as an SN (Secondary node). In DC, a UE may be connected to one MN and one SN.

In LTE DC, the radio protocol architecture that a particular bearer uses depends on how the bearer is setup. Three bearer types exist: MCG (Master Cell Group) bearer, SCG (Secondary Cell Group) bearer, and split bearers. RRC (Radio Resource Control) is located in MN and SRBs (Signaling Radio Bearers) are always configured as MCG bearer type and therefore only use the radio resources of the MN.

FIG. 1 is a block diagram illustrating a Long Term Evolution (LTE) DC User Plane (UP).

LTE-NR (New Radio) DC (also referred to as LTE-NR tight interworking) is currently being discussed for rel-15. In this context, significant changes from LTE DC include:
  The introduction of split bearer from the SN (known as SCG split bearer);
  The introduction of split bearer for RRC; and
  The introduction of a direct RRC from the SN (also referred to as SCG SRB).

FIGS. 2 and 3 illustrate the UP and Control Plane (CP) architectures for LTE-NR tight interworking.

In the case that the master node is an LTE node and the secondary node as an NR node, the SN may be referred to as SgNB (where gNB is an NR base station), and the MN may be referred to as MeNB. In the case that the master node is an NR node and the secondary node is an LTE node, the secondary node may be referred to as SeNB, and the master node may be referred to as MgNB.

Split RRC messages may be used primarily to create diversity, and the sender can decide to either choose one of the links for scheduling the RRC messages, or it can duplicate the message over both links. In the downlink, path switching between the MCG or SCG legs or duplication on both is left to network implementation. On the other hand, for the uplink, the network configures the UE to use the MCG, SCG, or both legs. The terms "leg" and "path" are used interchangeably throughout this document.

With dual connectivity DC for a UE, improved handling of failure on one of the DC legs for the UE may be desired.

SUMMARY

According to some embodiments of inventive concepts, a method of operating a wireless terminal providing dual connectivity communication through a master node using a master cell group, MCG, over a first radio interface between the wireless terminal and the master node and through a secondary node using a secondary cell group, SCG, over a second radio interface between the wireless terminal and the secondary node. A split signaling radio bearer, SRB, may be configured for the wireless terminal using dual connectivity through the MCG over the first radio interface with the master node and through the SCG over the second radio interface with the secondary node. Moreover, the wireless terminal may be configured to use the SCG over the second radio interface for the split SRB without using the MCG over the first radio interface for the split SRB. Responsive to detecting failure of the SCG over the second radio interface while configured to use the SCG over the second radio interface for the split SRB without using the MCG over the first radio interface for the split SRB, an SCG failure information message regarding failure of the SCG may be transmitted to the master node using the MCG.

According to some other embodiments of inventive concepts, a method of operating a first network node. The first network node may be configured to operate in cooperation with a second network node to provide dual connectivity communication with a wireless terminal so that the first network node operates as a master node using a master cell group, MCG, over a first radio interface between the first network node and the wireless terminal and so that the second network node operates as a secondary node using a secondary cell group, SCG, over a second radio interface between the secondary node and the wireless terminal. A split signaling radio bearer, SRB, may be configured for the wireless terminal using dual connectivity through the MCG over the first radio interface with the wireless terminal and through the SCG over the second radio interface with the wireless terminal, and the wireless terminal may be configured to use the SCG over the second radio interface for the split SRB without using the MCG over the first radio interface for the split SRB. An SCG failure indication message may be received from the second network node, and the SCG failure indication message may indicate failure of the SCG with the wireless terminal. Responsive to receiving the SCG failure indication, the first network node may determine that the SCG over the second radio interface with the wireless terminal has failed.

According to further embodiments of inventive concepts, there are provided corresponding wireless terminals and network nodes.

By reporting SCG failure using the MCG, RRC re-establishment may be reduced/avoided/delayed thereby providing more continuous service and/or reducing service interruption in the event of SCG failure.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIGS. 8-13 are flow charts illustrating network node operations according to some embodiments of inventive concepts.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 5:
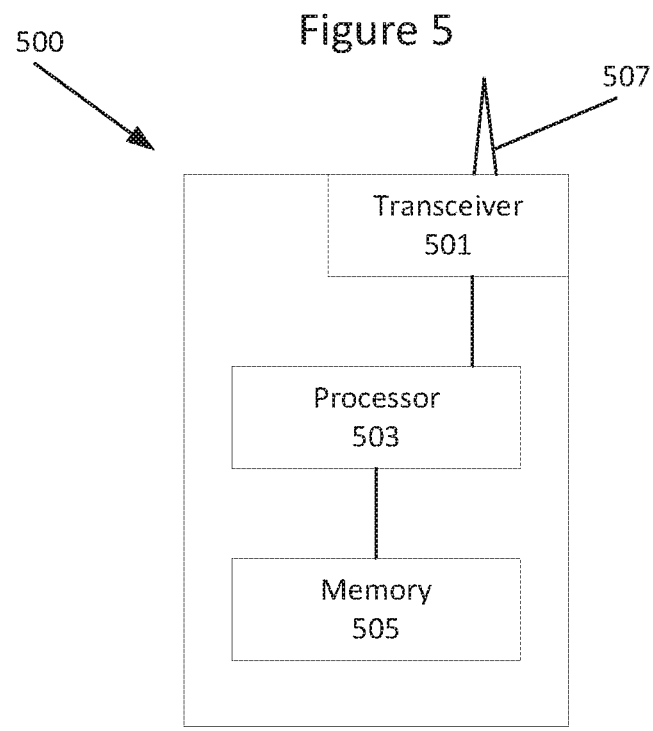
FIG. 5 is a block diagram illustrating a wireless terminal according to some embodiments of inventive concepts.

FIG. 5 is a block diagram illustrating elements of a wireless terminal 500 (also referred to as a wireless device, a wireless communication device, a wireless communication terminal, user equipment, UE, a user equipment node/terminal/device, etc.) configured to provide wireless communication according to some embodiments of inventive concepts. As shown, wireless terminal 500 may include an antenna 507, and a transceiver circuit 501 (also referred to as a transceiver) including a transmitter and a receiver configured to provide uplink and downlink radio communications with a base station(s) of a radio access network. Wireless terminal 500 may also include a processor circuit 503 (also referred to as a processor) coupled to the transceiver circuit, and a memory circuit 505 (also referred to as memory) coupled to the processor circuit. The memory circuit 505 may include computer readable program code that when executed by the processor circuit 503 causes the processor circuit to perform operations according to embodiments disclosed herein. According to other embodiments, processor circuit 503 may be defined to include memory so that a separate memory circuit is not required. Wireless terminal 500 may also include an interface (such as a user interface) coupled with processor 503, and/or wireless terminal 500 may be incorporated in a vehicle.

As discussed herein, operations of wireless terminal 500 may be performed by processor 503 and/or transceiver 501. For example, processor 503 may control transceiver 501 to transmit communications through transceiver 501 over a radio interface to a network base station and/or to receive communications through transceiver 501 from a network base station over a radio interface. Moreover, modules may be stored in memory 505, and these modules may provide instructions so that when instructions of a module are executed by processor 503, processor 503 performs respective operations (e.g., operations discussed below with respect to Example Embodiments).

Figure 6:
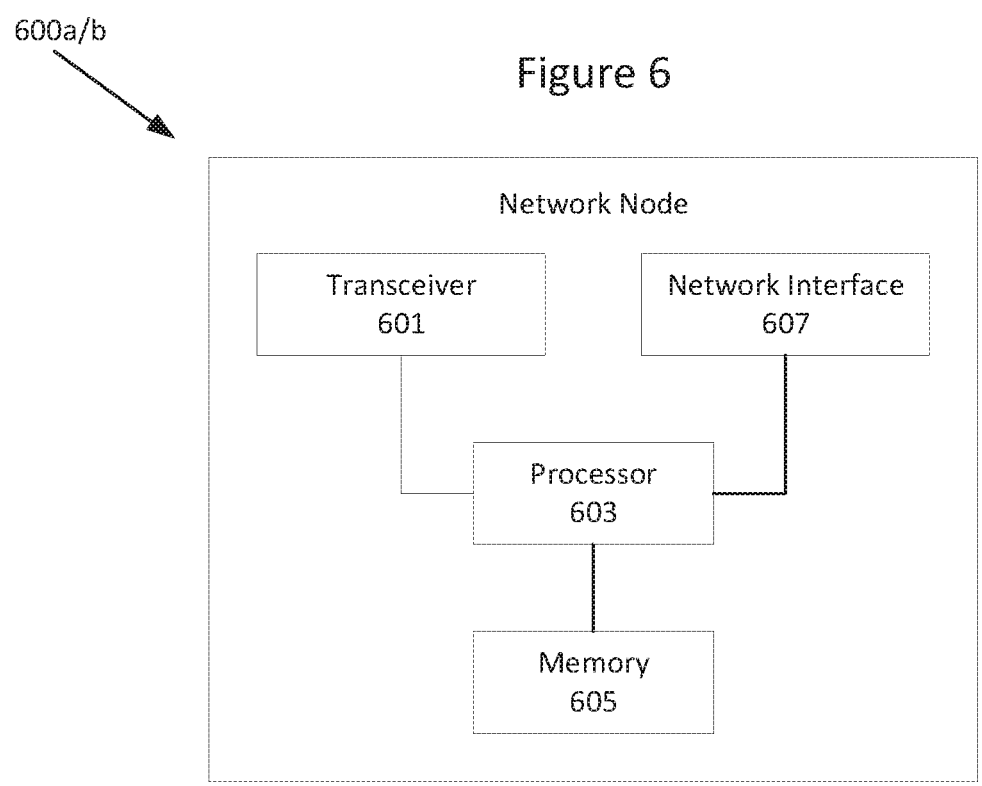
FIG. 6 is a block diagram of a network node according to some embodiments of inventive concepts.

FIG. 6 is a block diagram illustrating elements of a node 600a/b (also referred to as a network node, base station, eNB, eNodeB, etc.) of a Radio Access Network (RAN) configured to provide cellular communication according to embodiments of inventive concepts. As shown, the network node may include a transceiver circuit 601 (also referred to as a transceiver) including a transmitter and a receiver configured to provide uplink and downlink radio communications with wireless terminals. The network node may include a network interface circuit 607 (also referred to as a network interface) configured to provide communications with other nodes (e.g., with other base stations) of the RAN. The network node may also include a processor circuit 603 (also referred to as a processor) coupled to the transceiver circuit, and a memory circuit 605 (also referred to as memory) coupled to the processor circuit. The memory circuit 605 may include computer readable program code that when executed by the processor circuit 603 causes the processor circuit to perform operations according to embodiments disclosed herein. According to other embodiments, processor circuit 603 may be defined to include memory so that a separate memory circuit is not required. The reference number 600a will be used when a network node is discussed as operating as a master node, and the reference number 600b will be used when a network node is discussed as operating as a secondary node.

As discussed herein, operations of the network node may be performed by processor 603, network interface 607, and/or transceiver 601. For example, processor 603 may control transceiver 601 to transmit communications through transceiver 601 over a radio interface to one or more UEs and/or to receive communications through transceiver 601 from one or more UEs over a radio interface. Similarly, processor 603 may control network interface 607 to transmit communications through network interface 607 to one or more other network nodes and/or to receive communications through network interface from one or more other network nodes. Moreover, modules may be stored in memory 605, and these modules may provide instructions so that when instructions of a module are executed by processor 603, processor 603 performs respective operations (e.g., operations discussed below with respect to Example Embodiments).

According to some other embodiments, the network node may be implemented as a control node without a transceiver. In such embodiments, transmission to a wireless terminal may be initiated by the network node so that transmission to the wireless terminal is provided through a network node including a transceiver, e.g., through a base station. According to embodiments where the network node is a base station including a transceiver, initiating transmission may include transmitting through the transceiver.

The network node structure of FIG. 6 may be used to implement a master node/MN (using reference number 600a) or a secondary node/SN (using reference number 600b) according to embodiments of inventive concepts.

In LTE, a UE considers a radio link failure (RLF) to be detected when any of the following occurs:
  i. Upon detecting a certain number of out of sync indications from the lower layers associated with the PCell (Primary Cell) within a given time, or
  ii. Upon detecting a random access problem indication from MAC, or
  iii. Upon detecting an indication from RLC that the maximum number of retransmissions has been reached for an SRB or for a DRB (Data Radio Bearer).

When RLF is detected, the UE prepares an RLF report, which includes, among other information, the measurement status of the serving and neighbor cells at the moment when RLF was detected, goes to IDLE mode, selects a cell following an IDLE mode cell selection procedure (the selected cell could be the same serving node/cell or another node/cell) and start the RRC re-establishment procedure, with a cause value set to rlf-cause.

In the case of LTE DC, the RLF detection procedure is similar to what was described above except that for (i), only the PCell of the MN is of concern, the MAC in (ii) is the MCG MAC entity and the RLC in (iii) is the MCG RLC, and the DRB in (iii) corresponds to MCG and MCG-split DRBs.

On the other hand, failure on the secondary side, known as SCGFailure, may be detected when any of the following occurs:
  i. Upon detecting radio link failure for the SCG, in accordance with i, ii and iii above (i.e. replace PCell for PSCell, MCG MAC for SCG MAC, and MCG/MCG-Split DRB for SCG DRB), or
  ii. Upon detecting SCG change failure (i.e. not able to finalize SCG change within a certain duration after the reception of an RRC connection reconfiguration message instructing the UE to do so), or
  iii. Upon stopping uplink transmission towards the PSCell due to exceeding the maximum uplink transmission timing difference when powerControlMode is configured to 1.

Upon detecting SCGFailure, the UE sends an SCGFailureInformation message towards the MN, which also includes measurement reports, and the MN can either release the SN, change the SN/Cell, or reconfigure the SCG. Thus, a failure on the SCG will not lead to performance of a re-establishment on the MCG.

3GPP has agreed to adopt the same/similar principles in the context of LTE-NR interworking (i.e., re-establishment in the case of RLF on the master leg and recovery via SCGFailureInformation and SN release/change/modification in case of RLF on the secondary leg). Specifically, it has been agreed that upon SgNB failure, the UE shall:
  Suspend all SCG DRBs and suspend SCG transmission for MCG split DRBs, and SCG split DRBs;
  Suspend direct SCG SRB and SCG transmission for MCG split SRB;
  Reset SCG-MAC; and
  send the SCGFailureInformation message to the MeNB with corresponding cause values.

Scheduling request and buffer status report messages may be provided over the MAC layer.

In LTE, the scheduling request (SR) is a special physical layer message that generally is used by the UE to ask the network to send an UL Grant (DCI Format 0), thus allowing the UE to transmit over the PUSCH. The UE sends the SR on a PUCCH (or on UCI part on the PUSCH) according to a certain PUCCH format. Then, once the SR is transmitted, the eNB (upon reception) should send an UL Grant (DCI Format 0) to the UE that responds with an ACK over the PUSCH. The timing among SR, UL Grant, and ACK over PUSCH varies depending on whether FDD or TDD is employed. Even though the SR message itself is a physical layer message, it is controlled by MAC layer processes (See 3GPP TS 36.321 5.4.4 for details).

In LTE, the buffer status report (BSR) is a MAC CE (Control Element) message, that is sent by the UE to the eNB, carrying information about how much data is accumulated in the UE's buffer. There are three types of BSRs; Regular BSRs, Periodic BSRs, and Padding BSRs. The BSR is controlled by two RRC parameters (timers) called periodicBSR-Timer and retxBSR-Timer. A BSR shall be triggered if any of the following events occur:
  UL data, for a logical channel which belongs to a LCG, becomes available for transmission in the RLC entity or in the PDCP entity and either the data belongs to a logical channel with higher priority than the priorities of the logical channels which belong to any LCG and for which data is already available for transmission, or there is no data available for transmission for any of the logical channels which belong to a LCG, in which case the BSR is referred to as "Regular BSR";
  retxBSR-Timer expires and the UE has data available for transmission for any of the logical channels which belong to a LCG (Even this is also called as Regular BSR);
  UE has UL resources allocated and number of padding bits is equal to or larger than the size of the BSR MAC CE plus its subheader (This is referred to as Padding BSR); and/or
  When periodicBSR-Timer expires, the triggered BSR is called as Periodic BSR.

Discussions on SR and BSR in NR are still ongoing in 3GPP. It is reasonable to assume that most of the BSR/SR concepts in LTE will be adopted. Additionally, some enhancements that are being considered include:
  SRs that can indicate priority (e.g., a different SR for SRB vs DRB); and/or
  SRs that can indicate pending data size (e.g., SR type 1 for data less than X bytes, SR type 2 for data between X and Y, SRB type 3 for data between Y and Z, etc. . . . ).

Figure 1:
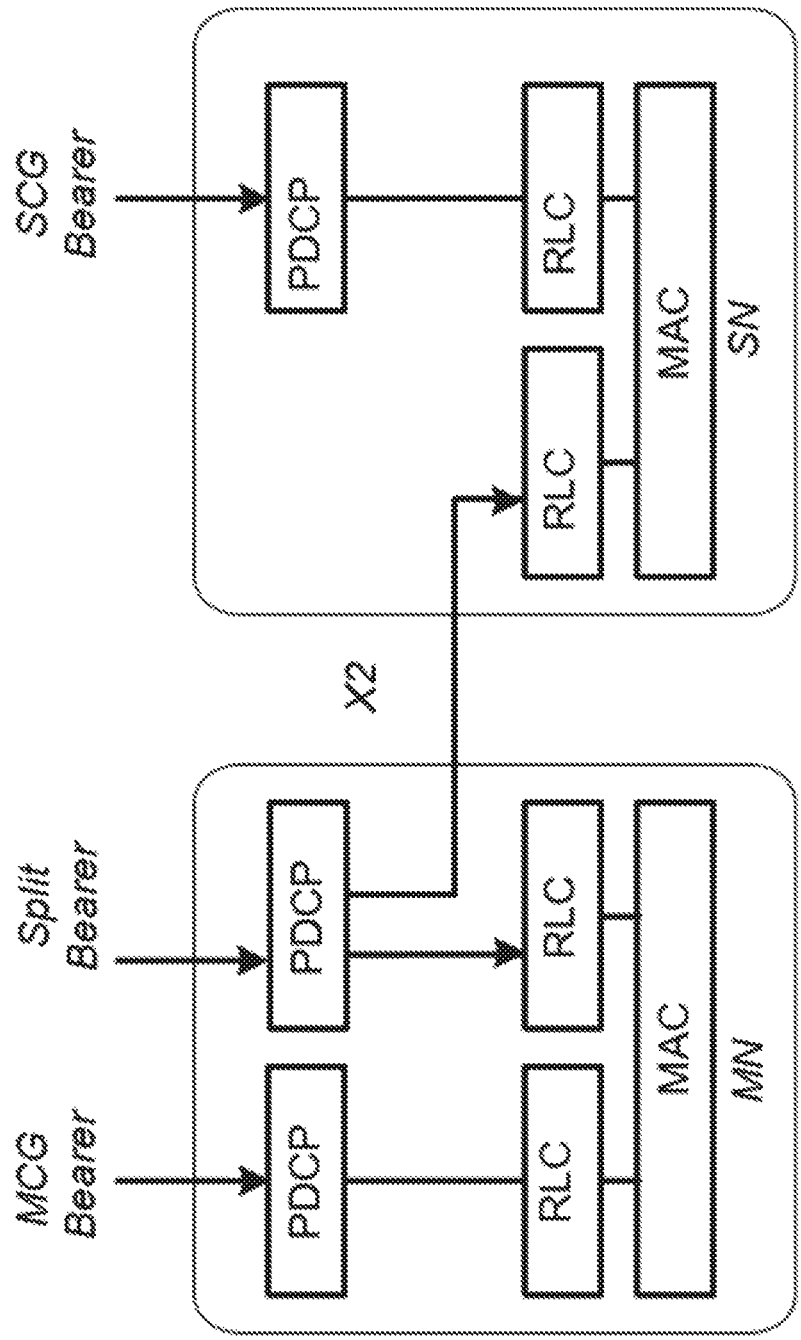
FIG. 1 is a block diagram illustrating a Long Term Evolution (LTE) DC User Plane (UP)
Figure 2:
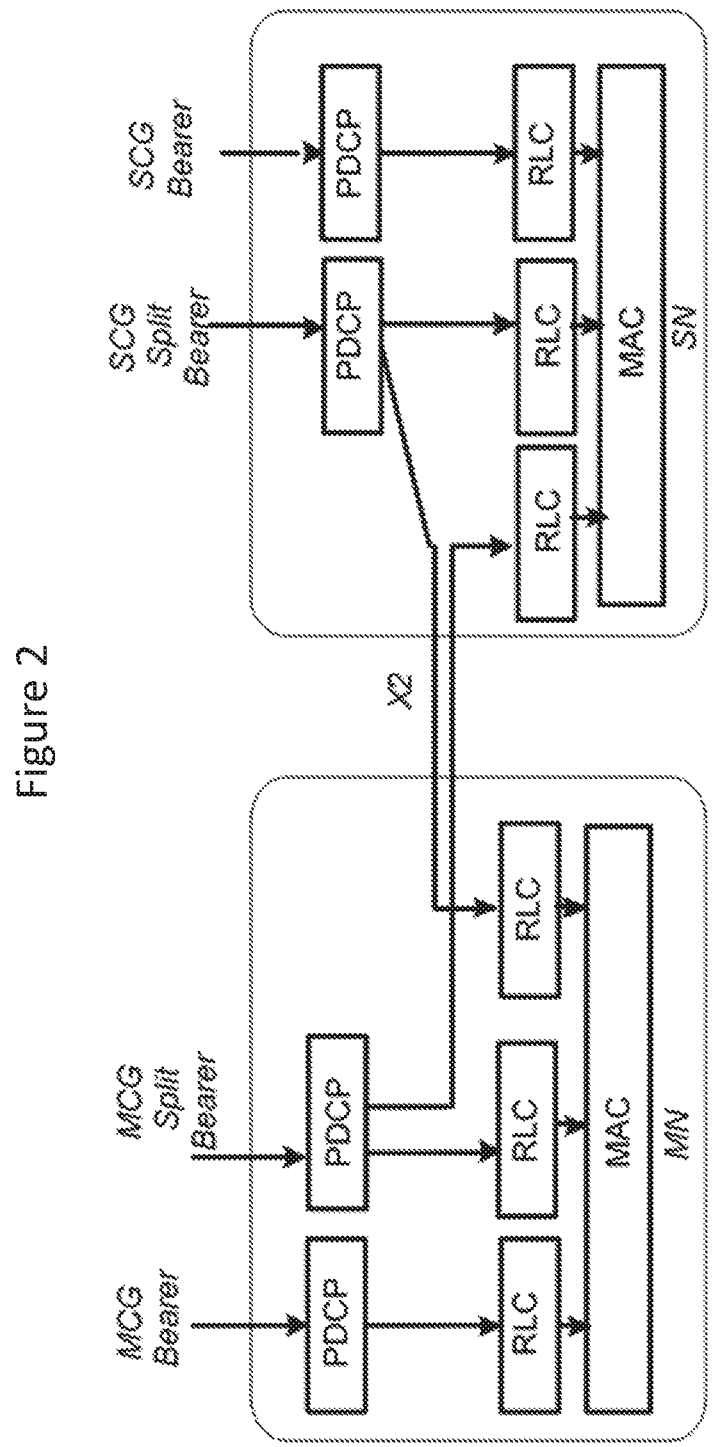
FIG. 2 is a block diagram illustrating LTE-New Radio (NR) tight interworking UP.
Figure 3:
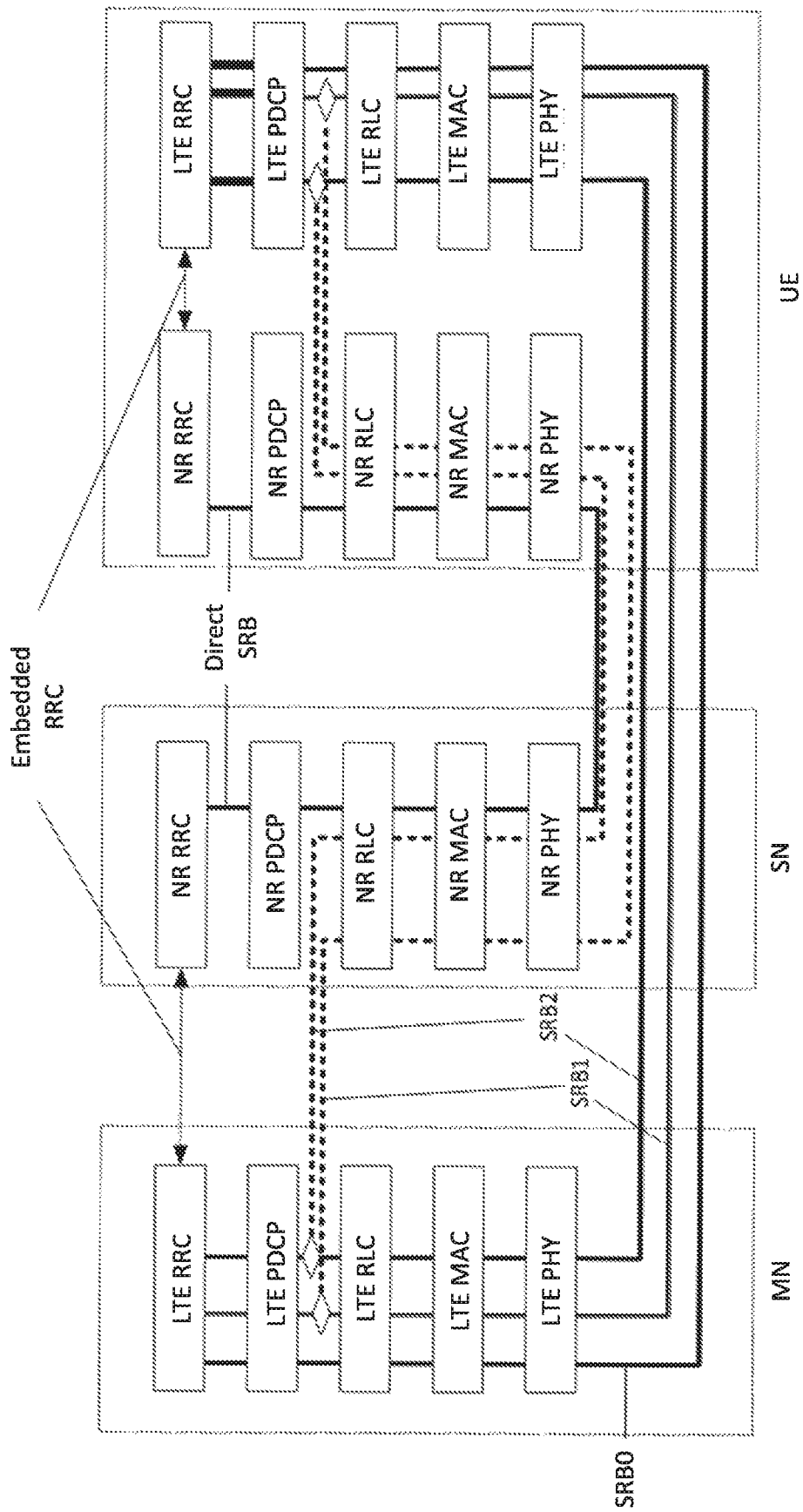
FIG. 3 is a block diagram illustrating LTE-NR tight interworking Control Plane (CP)
Figure 4B:
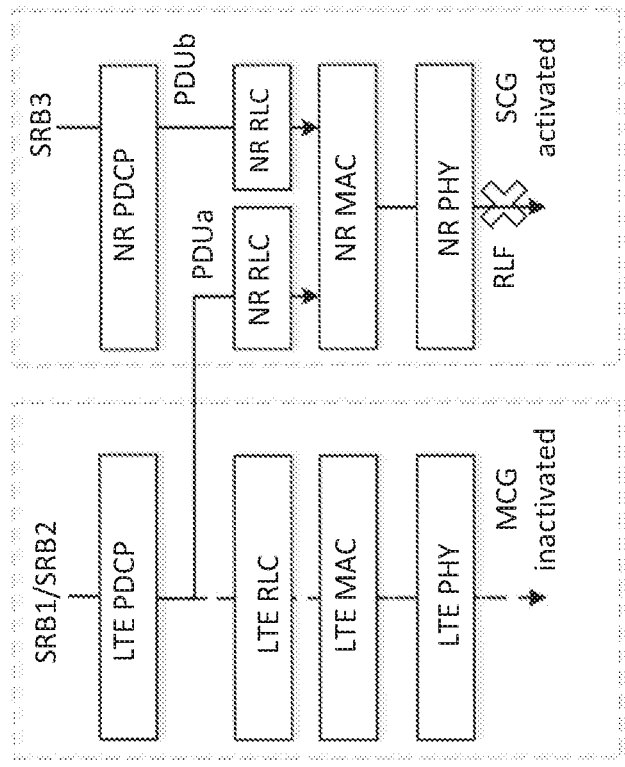
FIG. 4b is a block diagram illustrating configuration of an MCG split SRB with an activated SCG path and a configured SCG direct SRB.
Figure 4A:
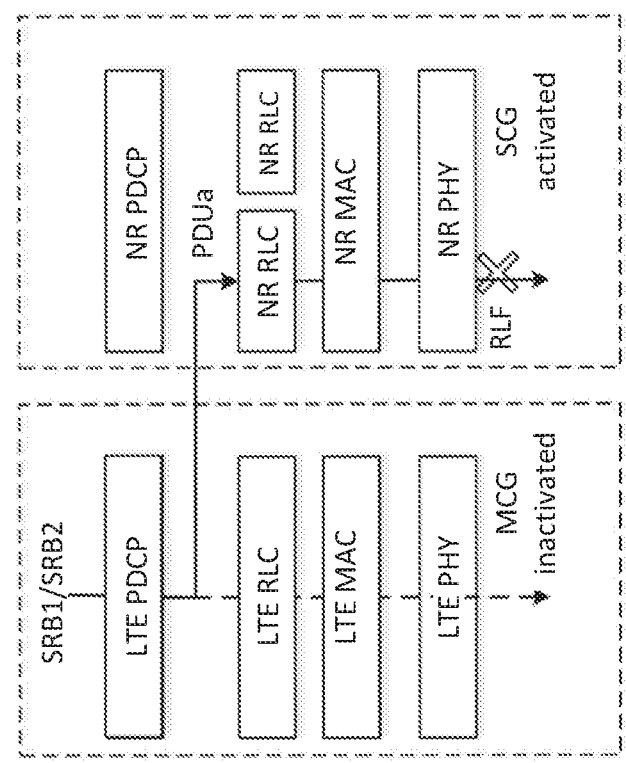
FIG. 4a is a block diagram illustrating configuration of a MGC split SRB with an activated SCG path.

As discussed above with respect to LTE-NR dual connectivity, with the introduction of split RRC from the MN, it may be possible to configure RRC messages from the MN to be sent either via the MCG leg, the SCG leg, or duplicated on both legs. If the UE was configured to use only the SCG path and an SCG failure occurs, it may not be clear on how the UE proceeds because it may not be possible to send the SCGFailureInformation to the MN because the only UL path that the UE is configured to use for RRC messages (i.e., the SCG path) may not be available anymore (as the UE has encountered failure toward the SN). This possibility is illustrated in FIGS. 4a and 4b where SCG failure occurs and SCG is the only possible path. In FIG. 4a, a MCG split SRB is configured, the SCG path is activated (or configured), the MCG path is inactivated (or not configured), and Radio Link Failure RLF occurs on the SCG path. In FIG. 4b, a MCG split SRB is configured, the SCG path is activated (or configured), the SCG direct SRB is configured, the MCG path is inactivated (or not configured), and Radio Link Failure RLF occurs on the SCG path.

One approach could be to trigger RRC re-establishment (i.e., tearing down the whole radio and setting it up and/or reconfiguring it again, including the DC aspects, possibly with another SN). However, this may cause significant service interruption time. According to some embodiments of inventive concepts, alternative mechanisms are proposed that may resolve the SCG failure without and/or reducing this interruption.

According to some embodiments of inventive concepts, mechanisms may be provided to recover from a situation where the SCG fails and the SCG leg is the only configured path for the transmission of RRC messages between the UE and the MN (i.e., split SRB). This may be accomplished by the switching of the UL path immediately to the MCG without the need for re-establishment the whole connection.

In case of dual connectivity, upon an SCG failure, one solution may be to call an RRC re-establishment thus setting up the whole radio from scratch. This procedure, however, may cause a significant service interruption time that may be difficult to tolerate, for example, when considering ultra-reliable and low-latency communication (URLLC).

According to some embodiments of inventive concepts, RRC re-establishment may be reduced/avoided by exploiting UE path switching in case the SCG fails and the SCG is the only configured path. In this way, the UE may experience a relatively continuous connectivity without incurring long service interruption time.

Even though the present disclosure focuses on the LTE-NR tight interworking case where the master node is an LTE node, embodiments of inventive concepts may also be applicable to other DC cases such as LTE-NR DC where the master node is an NR node (and the secondary node is an LTE node), NR-NR DC where both the master and secondary nodes are NR nodes, or even between LTE/NR nodes and nodes of other RATs.

When split RRC is setup between the MN and the UE, if the UE detects an SCG failure the actions to be taken may include:
  A. The UE suspends all SCG DRBs and SCG transmission for MCG Split DRBs, SCG split DRBs;
  B. The UE suspends direct SCG SRB and SCG transmission for MCG Split SRB;
  C. The UE resets the SCG MAC; and
  D. The UE prepares an SCGFailureInformation message to be sent to the MN, which also includes a measurement report.

If the UE was configured to use either the MCG leg or both the MCG and SCG legs, then operations may include:
  A) If the UE has any available scheduling grant in the UL on the configured MCG leg, it will use that grant to send the SCGFailureInformation message; or
  B) If the UE has no grant available in the UL on the configured MCG leg, it will send a scheduling request SR to the MN;
    1. When the UE receives a grant corresponding to the scheduling request SR, it will use it to send the SCGFailureInformation message.

Figure 7:
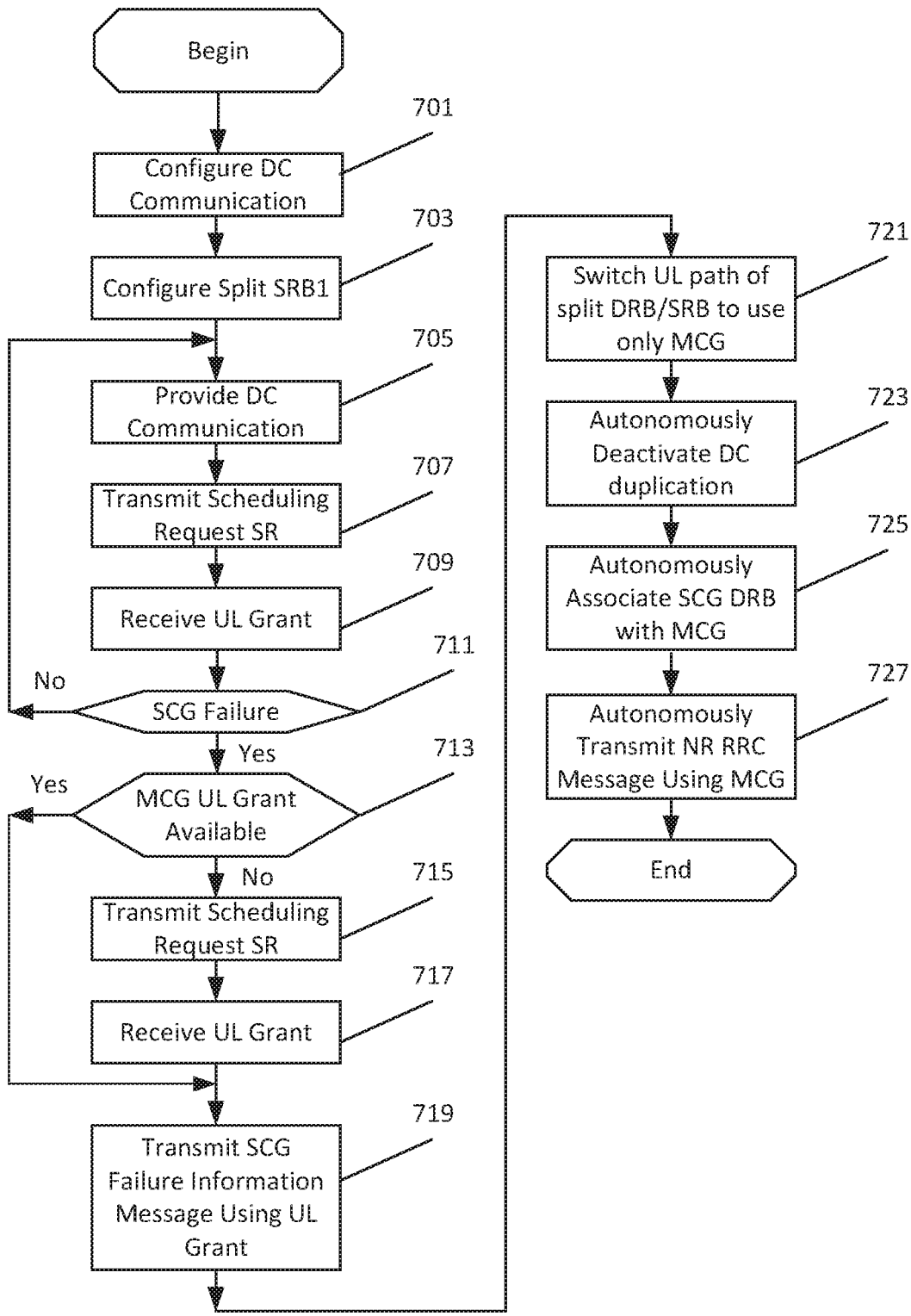
FIG. 7 is a flow chart illustrating wireless terminal operations according to some embodiments of inventive concepts.

FIG. 7 is a flow chart illustrating wireless terminal 500 operations according to some embodiments of inventive concepts. For example, modules may be stored in wireless terminal memory 505 of FIG. 5, and these modules may provide instructions so that when the instructions of a module are executed by processor 503, processor 503 performs respective operations of the flow chart of FIG. 7.

At block 701, wireless terminal 500 processor 503 may configure dual connectivity DC communication (e.g., using a DC configuration module). The DC communication may be configured through a master node 600a (also referred to as a master base station or master network node) using a MCG over a first radio interface between the wireless terminal and the master node and through a secondary node 600b (also referred to as a secondary base station or a secondary network node) using a SCG over a second radio interface between the wireless terminal and the secondary node.

At block 703, processor 503 may configure a split SRB for SRB1 for the wireless terminal (e.g., using a split SRB configuration module). The split SRB1 for wireless terminal 500 may be configured using dual connectivity through the MCG over the first radio interface with the master node and through the SCG over the second radio interface with the secondary node, with the wireless terminal being configured to use the SCG over the second radio interface for the split SRB1 without using the MCG over the first radio interface for the split SRB1. With such a configuration, PDCP, RLC, MAC, and PHY layers may be configured by wireless terminal 500 for the MCG leg/path of the split SRB1, and separate RLC, MAC, and PHY layers may be configured by wireless terminal 500 for the SCG leg/path of split SRB1. The SCG leg/path is activated so that the MCG PDCP layer and the SCG RLC, SCG MAC, and SCG PHY layers are used for split SRB1 transmissions through the SCG, but the MCG leg/path is inactivated so that the MCG leg/path for the split SRB1 is not used.

At block 705, processor 503 may provide DC communication through transceiver 502 (e.g., using a DC communication module) using the split SRB1. While providing DC communication, processor 503 may transmit scheduling requests SRs through transceiver 501 at block 707 (e.g., using a SR transmission module) and receive respective uplink (UL) grants through transceiver 501 at block 709 (e.g., using a grant reception module), and the uplink grants may be used for transmissions supporting DC communication at block 705. Operations of blocks 705, 707, and 709 may continue for SRB1 uplink transmissions until an SCG failure is detected at block 711 (e.g., using an SCG failure detection module).

At block 707, processor 503 may thus transmit scheduling requests through transceiver 502 to the master node using the MCG, and at block 709, processor 503 may receive respective uplink grants for the MCG to support DC communications. If an uplink grant for the MCG has been received and the uplink resources remain available after detecting SCG failure at block 711, the available uplink grant for the MCG may be used for an SCG failure message as discussed below. In this case, the uplink grant for the MCG may be received before or after detecting SCG failure at block 711, but the corresponding SR request may have been transmitted before detecting the SCG failure at block 711. Stated in other words, processor 503 may transmit a scheduling request SR for an MCG uplink resource through transceiver 502 to the master node at block 707 before detecting failure of the SCG at block 711, and processor 503 may receive the corresponding uplink grant for an MCG uplink resource from the master node through transceiver 502 at block 709. For example, the scheduling request SR may be transmitted to obtain uplink resources for uplink data of a DRB for the MCG or for uplink data of SRB2 for the MCG, with the wireless terminal being configured to use the MCG for SRB2. If such an uplink grant is available at block 713, processor 503 may transmit SCG failure information at block 719 without requiring another SR and without waiting for another UL grant.

In an alternative, processor 503 may detect SCG failure at block 711, and an MCG uplink grant may not be available at block 713. In this situation, processor 503 may transmit a scheduling request SR through transceiver 501 to the master node at block 715 (e.g., using the SR transmission module), and processor 503 may receive the corresponding uplink grant for the MCG from the master node through transceiver 501 at block 717 (e.g., using the grant reception module). In this case, the scheduling request may include an indication that the scheduling request is for high priority SRB1 data.

Responsive to detecting failure of the SCG over the second radio interface while configured to use the SCG over the second radio interface for the split SRB1 without using the MCG over the first radio interface for the split SRB1 at block 711, processor 503 may transmit an SCG failure information message regarding failure of the SCG through transceiver 501 to the master node using the MCG at block 719 (e.g., using failure information message transmission module). More particularly, the SCG failure information message may be transmitted using uplink resources defined by an uplink grant of either block 709 or 717. The SCG failure information message may be transmitted, for example, using a signaling radio bearer two SRB2.

Moreover, transmitting the SCG failure information message at block 719 may include transmitting the SCG failure information message multiplexed with other pending data using the uplink resources defined by the uplink grant from the master node. Such other pending data, for example, may include: SRB data and/or DRB data; data of a split SRB2 that is configured to use the MCG over the first radio interface in the uplink, to use the SCG over the second radio interface in the uplink, or to use both the MCG over the first radio interface and the SCG over the second radio interface in the uplink; data of a split DRB that is configured to use the MCG over the first radio interface in the uplink, to use the SCG over the second radio interface in the uplink, or to use both the MCG over the first radio interface and the SCG over the second radio interface in the uplink; data of an SCG DRB; and/or data of an MCG DRB.

In the event that a scheduling request is transmitted at block 715, a predetermined time period may be provided (e.g., a predetermined time period after transmitting the SR or a predetermined time period after detecting the SCG failure) to receive the uplink grant at block 717. Responsive to receiving the uplink UL grant within the predetermined time period, processor 503 may transmit the SCG failure information message at block 719 at discussed above. Responsive to failure to receive the UL grant within the predetermined time period, processor 503 may initiate radio resource control (RRC) reestablishment.

Processor 503 may perform further operations responsive to detecting failure of the SCG as discussed below with respect to blocks 721, 723, 725, and/or 727. Responsive to detecting failure of the SCG over the second radio interface, processor 503 may switch an uplink path of a split DRB and/or a split SRB to use only the MCG over the first radio interface at block 721 (e.g., using a switching module). Responsive to detecting failure of the SCG over the second radio interface, processor 503 may deactivate DC duplication on any split DRB and/or SRB at block 723 (e.g., using a deactivation module).

Responsive to detecting failure of the SCG over the second radio interface, processor 503 may associate (725) an uplink SCG DRB with the MCG over the first radio interface at block 725 (e.g., using an association module). Associating the uplink SCG DRB with the MCG over the first radio interface may include embedding data of the SCG DRB in an MCG DRB uplink transmission.

In addition, SN RRC messages may be configured for transmission using a SRB of the SCG over the second radio interface. Responsive to detecting failure of the SCG over the second radio interface, processor 503 may transmit (727) an SN RRC message using the MCG over the first radio interface at block 727 (e.g., using an RRC message transmission module). For example, the SN RRC message may be transmitted as an embedded RRC message using the MCG over the first radio interface.

According to some embodiments discussed above with respect to FIG. 7, the master node may be an LTE base station and the secondary node may be an NR base station, or the master node may be an NR base station and the secondary node may be an LTE base station.

Operations of FIG. 7 are provided by way of example, and various operations of FIG. 7 and/or related modules may be optional. For example, operations of blocks 701, 705, 707, 709, 711, 713, 715, 717, 721, 723, 725, and 727 may be optional with respect to Example Embodiment 1 discussed below.

FIGS. 8, 9, and 10 are flow charts illustrating operations of a first network node 600a according to some embodiments of inventive concepts. For example, modules may be stored in network node memory 605 of FIG. 6, and these modules may provide instructions so that when the instructions of a module are executed by network node processor 603, processor 603 performs respective operations of a flow chart of FIG. 8, 9, or 10.

In each of FIGS. 8, 9, and 10, the first network node may be configured to operate in cooperation with a second network node to provide dual connectivity DC communication with a wireless terminal 500. More particularly, the first network node 600a may operate as a master node using a MCG over a first radio interface between the first network node and the wireless terminal, and the second network node 600b may operate as a secondary node using a SCG over a second radio interface between the secondary node and the wireless terminal.

At block 801 of FIG. 8, processor 603 may configure a split SRB1 (e.g., using an SRB configuration module). The split SRB1 may be configured using dual connectivity DC through the MCG over the first radio interface with the wireless terminal and through the SCG over the second radio interface with the wireless terminal, with the wireless terminal being configured to use the SCG over the second radio interface for the split SRB1 without using the MCG over the first radio interface for the split SRB1. Such configuration of SRB1 is discussed above with respect to block 703 of FIG. 7.

At block 803 of FIG. 8, processor 603 may receive a scheduling request from the wireless terminal 500 through transceiver 601 using the MCG over the first radio interface while the split SRB1 is configured for the wireless terminal (e.g., using an SR reception module). The scheduling request may include an indication that the scheduling request is for high priority SRB1 data, and/or the scheduling request may be associated with the split SRB1. Responsive to receiving the scheduling request, processor 603 may determine that the SCG over the second radio interface with the wireless terminal has failed at block 805 (e.g., using a failure determination module).

At block 901 of FIG. 9, processor 603 may configure a split SRB1 (e.g., using an SRB configuration module). The SRB1 may be configured using dual connectivity through the MCG over the first radio interface with the wireless terminal and through the SCG over the second radio interface with the wireless terminal, with the wireless terminal being configured to use the SCG over the second radio interface for the split SRB without using the MCG over the first radio interface for the split SRB1. Such configuration of SRB1 is discussed above with respect to block 703 of FIG. 7.

At block 903 of FIG. 9, processor 603 may receive a medium access control (MAC) Control Element (CE) from the wireless terminal through transceiver 601 indicating failure of the SCG with the wireless terminal (e.g., using a MAC CE reception module). Responsive to receiving the MAC CE, processor 603 may determine that the SCG over the second radio interface with the wireless terminal has failed at block 905 (e.g., using a failure determination module).

At block 1001 of FIG. 10, processor 603 may configure a split SRB1 (e.g., using an SRB configuration module). The SRB1 may be configured using dual connectivity through the MCG over the first radio interface with the wireless terminal and through the SCG over the second radio interface with the wireless terminal, with the wireless terminal being configured to use the SCG over the second radio interface for the split SRB without using the MCG over the first radio interface for the split SRB. Such configuration of SRB1 is discussed above with respect to block 703 of FIG. 7.

At block 1003 of FIG. 10, processor 603 may receive an SCG failure indication message from the second network node through network interface 607 (e.g., using a message reception module). Moreover, the SCG failure indication message may indicate failure of the SCG with the wireless terminal. Responsive to receiving the SCG failure indication, processor 603 may determine that the SCG over the second radio interface with the wireless terminal has failed at block 1005 (e.g., using failure determination module).

In each of FIGS. 8, 9, and 10, processor 603 may process communications responsive to SCG failure as discussed below.

At block 1007 for example, processor 603 may prioritize scheduling for the wireless terminal relative to other wireless terminals (e.g., using a prioritization module) responsive to determining that the SCG between the second network node and the wireless terminal has failed.

At block 1007 for example, processor 603 may increase an uplink grant size for the wireless terminal responsive to determining that the SCG between the second network node and the wireless terminal has failed.

At block 1007 for example, processor 603 may suspend downlink transmissions of the split SRB through the second network node and the SCG to the wireless terminal responsive to determining that the SCG between the second network node and the wireless terminal has failed.

At block 1007 for example, processor 603 may suspend downlink transmissions of all split SRBs and/or all split DRBs through the second network node and the SCG to the wireless terminal responsive to determining that the SCG between the second network node and the wireless terminal has failed.

At block 1007 for example, processor 603 may change a bearer type of all SCG DRBs to SCG split DRBs and/or MCG split DRBs and/or MCG DRBs responsive to determining that the SCG between the second network node and the wireless terminal has failed. At block 1007 for example, processor 603 may transmit an RRC Connection Reconfiguration message through the MCG over the first radio link to the wireless terminal to communicate that all the SCG DRBs are changed to the SCG split DRBs and/or the MCG split DRBs and/or the MCG DRBs responsive to determining that the SCG between the second network node and the wireless terminal has failed.

At block 1007 for example, responsive to determining that the SCG between the second network node and the wireless terminal has failed, processor 603 may: change a bearer type of all MCG split DRBs to MCG DRBs; change a bearer type of all MCG split SRBs to MCG SRBs; and/or change a bearer type of all SCG split DRBs to MCG DRBs. In addition at block 1007, processor 603 may transmit an RRC Connection Reconfiguration message through the MCG over the first radio link to the wireless terminal to communicate changing the bearer type responsive to determining that the SCG between the second network node and the wireless terminal has failed.

At block 1007 for example, processor 603 may receive an uplink transmission from the wireless terminal through transceiver 601 using an MCG DRB wherein the uplink transmission includes embedded data of an SCG DRB, and responsive to receiving the uplink transmission, transmit the embedded data of the SCG DRB through transceiver 601 over a network interface to the second network node.

At block 1007 for example, processor 603 may receive an uplink transmission from the wireless terminal through transceiver 601 using an MCG SRB wherein the uplink transmission includes embedded data of an SCG SRB and processor may transmit the embedded data of the SCG SRB through transceiver 601 over a network interface to the second network node.

At block 1007 for example, processor 603 may release the second network node as a secondary node with respect to the wireless terminal responsive to determining that the SCG between the second network node and the wireless terminal has failed.

At block 1007 for example, processor 603 may add a third network node as a secondary node with respect to the wireless terminal responsive to determining that the SCG between the second network node and the wireless terminal has failed.

At block 1007 for example, processor 603 may transmit an RRC Connection Reconfiguration message through transceiver 601 using the MCG over the first radio link to the wireless terminal responsive to determining that the SCG between the second network node and the wireless terminal has failed. More particularly, the RRC Connection Reconfiguration message may be transmitted to communicate that the second network node has been released and that the third network node has been added as a secondary node with respect to the wireless terminal.

In embodiments of FIGS. 8, 9, and 10, the first network node may be an LTE base station and the second network node may be an NR base station, or wherein the first network node may be an NR base station and the second network node may be an LTE base station.

Operations of FIGS. 8, 9, and 10 are provided by way of example, and various operations of these figures and/or related modules may be optional. For example, operations of blocks 1007 of FIGS. 8, 9, and 10 may be optional with respect to Example Embodiments 27, 31, and 32 discussed below.

FIGS. 11 and 12 are flow charts illustrating operations of a first network node according to some embodiments of inventive concepts. For example, modules may be stored in network node memory 605 of FIG. 6, and these modules may provide instructions so that when the instructions of a module are executed by network node processor 603, processor 603 performs respective operations of a flow chart of FIG. 11 or 12.

In each of FIGS. 11 and 12, the first network node 600*a* may be configured to operate in cooperation with a second network node 600*b* to provide dual connectivity DC communication with a wireless terminal 500. More particularly, the first network node 600*a* operates as a master node using a MCG over a first radio interface between the first network node 600*a* and the wireless terminal 500 and the second network node 600*b* operates as a secondary node using a SCG over a second radio interface between the secondary node 600*b* and the wireless terminal 500.

At block 1101 of FIG. 11, processor 603 may receive an uplink transmission from the wireless terminal through transceiver 601 using an MCG DRB (e.g., using a uplink reception module), and the uplink transmission may include embedded data of an SCG DRB. Responsive to receiving the uplink transmission, processor 603 may transmit the embedded data of the SCG DRB over network interface 607 to the second network node at bloc 1103 (e.g., using a data transmission module).

At block 1201 of FIG. 11, processor 603 may receive an uplink transmission from the wireless terminal through transceiver 601 using an MCG SRB (e.g., using an uplink reception module), and the uplink transmission may include embedded data of an SCG SRB. Responsive to receiving the uplink transmission, processor 603 may transmit the embedded data of the SCG SRB over a network interface to the second network node at block 1203 (e.g., using a data transmission module).

In embodiments of FIGS. 11 and 12, the first network node may be an LTE base station and the second network node may be an NR base station, or wherein the first network node may be an NR base station and the second network node may be an LTE base station.

Operations of FIGS. 11, and 12 are provided by way of example, and various operations of these figures and/or related modules may be optional.

FIG. 13 is a flow chart illustrating operations of a second network node 600*b* according to some embodiments of inventive concepts. For example, modules may be stored in network node memory 605 of FIG. 6, and these modules may provide instructions so that when the instructions of a module are executed by network node processor 603, processor 603 performs respective operations of the flow chart of FIG. 13.

The second network node 600*b* is configured to operate in cooperation with a first network node 600*a* to provide dual connectivity DC communication with a wireless terminal 500. The first network node 600*a* operates as a master node using a MCG over a first radio interface between the first network node and the wireless terminal and the second network node 600*b* operates as a secondary node using a SCG over a second radio interface between the secondary node and the wireless terminal. At block 1301 of FIG. 13, processor 603 detects at the second network node SCG failure between the second network node and the wireless terminal (e.g., using a detection module). Responsive to detecting SCG failure, processor 603 transmits transmitting a failure information report over a network interface 607 to the first network node at block 1303. Moreover, the failure information report may include an identity of the wireless terminal. In addition, the first network node may be an LTE base station and the second network node may be an NR base station, or wherein the first network node may be an NR base station and the second network node may be an LTE base station.

Operations of FIG. 13 are provided by way of example, and various operations of FIG. 13 and/or related modules may be optional.

As used herein, a Signaling Radio Bearer (SRB) may be used for Radio Resource Control (RRC) messages (used as signaling between a wireless terminal and a base station eNB/gNB) and for Non-Access Stratum (NAS) messages (used as signaling between a wireless terminal and a Mobility Management Entity (MME)). Moreover, particular SRBs have been defined as follows:

SRB0 (or SRB zero) is for RRC messages using the CCCH (Common Control Channel) logical channel;

SRB1 (or SRB one or first SRB) is for RRC messages (which may include a piggybacked NAS message) as well as for NAS messages prior to the establishment of SRB2, all using DCCH (Dedicated Control Channel) logical channel; and SRB2 (or SRB two or second SRB) is for RRC messages which include logged measurement information as well as for NAS messages, all using DCCH logical channel. SRB2 has a lower-priority than SRB1 and is always configured by E-UTRAN (Evolved UMTS Terrestrial Radio Access Network) after security activation.

EXAMPLE EMBODIMENTS

1. A method of operating a wireless terminal (500) providing dual connectivity, DC, communication through a master node using a master cell group, MCG, over a first radio interface between the wireless terminal and the master node and through a secondary node using a secondary cell group, SCG, over a second radio interface between the wireless terminal and the secondary node, the method comprising: configuring (703) a split signaling radio bearer, SRB, for the wireless terminal using dual connectivity through the MCG over the first radio interface with the master node and through the SCG over the second radio interface with the secondary node, wherein the wireless terminal is configured to use the SCG over the second radio interface for the split SRB without using the MCG over the first radio interface for the split SRB; and responsive to detecting failure of the SCG over the second radio interface while configured to use the SCG over the second radio interface for the split SRB without using the MCG over the first radio interface for the split SRB, transmitting (719) an SCG failure information message regarding failure of the SCG to the master node using the MCG.

2. The method of Embodiment 1, wherein transmitting the SCG failure information message comprises transmitting the SCG failure information message using uplink resources defined by an uplink grant from the master node.

3. The method of Embodiment 2, wherein the uplink grant from the master node is an uplink grant for the MCG, the method further comprising: before detecting failure of the SCG, transmitting (707) a scheduling request, SR, to the master node; and receiving (709) the uplink grant for the MCG from the master node, wherein the uplink grant corresponds to the scheduling request, SR.

4. The method of Embodiment 3, wherein transmitting the scheduling request, SR, comprises transmitting the scheduling request, SR, to obtain uplink resources for uplink data of a data radio bearer, DRB.

5. The method of Embodiment 3, wherein the split SRB is a first signaling radio bearer, SRB1, wherein transmitting the scheduling request, SR, comprises transmitting the scheduling request, SR, to obtain uplink resources for uplink data of a second signaling radio bearer, SRB2, wherein the wireless terminal is configured to use the MCG for the second signaling radio bearer, SRB2.

6. The method of Embodiment 2 further comprising: responsive to detecting failure of the SCG over the second radio interface while configured to use the SCG over the second radio interface for the split SRB without using the MCG over the first radio interface for the split SRB, transmitting (715) a scheduling request, SR, to the master node; and receiving (717) the uplink grant for the MCG from the master node, wherein the uplink grant corresponds to the scheduling request.

7. The method of Embodiment 6, wherein the scheduling request includes an indication that the scheduling request is for high priority SRB1 data.

8. The method of any of Embodiments 2-7, wherein transmitting the SCG failure information message comprises transmitting the SCG failure information message multiplexed with other pending data using the uplink resources defined by the uplink grant from the master node.

9. The method of Embodiment 8, wherein the other pending data comprises signaling radio bearer data and/or data radio bearer data.

10. The method of Embodiment 8, wherein the other pending data comprises data of a split second signaling radio bearer, SRB2, that is configured to use the MCG over the first radio interface in the uplink, to use the SCG over the second radio interface in the uplink, or to use both the MCG over the first radio interface and the SCG over the second radio interface in the uplink.

11. The method of Embodiment 8, wherein the other pending data comprises data of a split data radio bearer, DRB, that is configured to use the MCG over the first radio interface in the uplink, to use the SCG over the second radio interface in the uplink, or to use both the MCG over the first radio interface and the SCG over the second radio interface in the uplink.

12. The method of Embodiment 8, wherein the other pending data comprises data of an SCG data radio bearer, DRB.

13. The method of Embodiment 8, wherein the other pending data comprises data of an MCG data radio bearer, DRB.

14. The method of any of Embodiments 1-13, further comprising: responsive to detecting failure of the SCG over the second radio interface, switching (721) an uplink path of a split data radio bearer, DRB, and/or a split signaling radio bearer, SRB, to use only the MCG over the first radio interface.

15. The method of any of Embodiments 1-14, further comprising: responsive to detecting failure of the SCG over the second radio interface, deactivating (723) DC duplication on any split data radio bearer, DRB, and/or signaling radio bearer, SRB.

16. The method of any of Embodiments 1-15, further comprising: responsive to detecting failure of the SCG over the second radio interface, associating (725) an uplink SCG data radio bearer, DRB, with the MCG over the first radio interface.

17. The method of Embodiment 16, wherein associating the uplink SCG DRB with the MCG over the first radio interface comprises embedding data of the SCG DRB in an MCG DRB uplink transmission.

18. The method of any of Embodiments 1-17, wherein SN RRC messages are configured for transmission using a signaling radio bearer of the SCG over the second radio interface, the method further comprising: responsive to detecting failure of the SCG over the second radio interface, transmitting (727) an SN RRC message using the MCG over the first radio interface.

19. The method of Embodiments 18, wherein the SN RRC message is transmitted as an embedded RRC message using the MCG over the first radio interface.

20. The method of any of Embodiments 1-4 and 6-19, wherein the split SRB is a split first signaling radio bearer, SRB1.

21. The method of Embodiment 20, wherein transmitting the SCG failure information message comprises transmitting the SCG failure information message using a second signaling radio bearer, SRB2.

22. The method of any of Embodiments 1-21, wherein the wireless terminal is configured to use only the SCG over the second radio interface for the split SRB.

23. The method of Embodiment 1 further comprising: responsive to detecting failure of the SCG over the second radio interface while configured to use the SCG over the second radio interface for the split SRB without using the MCG over the first radio interface for the split SRB, transmitting a scheduling request, SR, to the master node; transmitting the SCG failure information message if an uplink grant for the MCG is received from the master node within a predetermined time period after transmitting the SR or detecting the failure of the SCG, wherein the SCG failure information message is transmitted using uplink resources defined by the uplink grant; and initiating Radio Resource Control, RRC, reestablishment if no uplink grant for the MCG is received from the master node within the predetermined time period.

24. A wireless terminal (500) comprising: a transceiver (501) configured to provide wireless communication in a wireless communication network; and a processor (503) coupled with the transceiver, wherein the processor is configured to provide wireless network communication through the transceiver, wherein the processor is configured to perform operations according to any of Embodiments 1-23.

25. A wireless terminal (500), wherein the wireless terminal is adapted to perform operations according to any of Embodiments 1-23.

26. A wireless terminal (500), wherein the wireless terminal includes modules configured to perform operations according to any of Embodiments 1-23.

27. A method of operating a first network node (600*a*), wherein the first network node is configured to operate in cooperation with a second network node (600*b*) to provide dual connectivity, DC, communication with a wireless terminal (500) so that the first network node operates as a master node using a master cell group, MCG, over a first radio interface between the first network node and the wireless terminal and so that the second network node operates as a secondary node using a secondary cell group, SCG, over a second radio interface between the secondary node and the wireless terminal, the method comprising: configuring (801) a split signaling radio bearer, SRB, for the wireless terminal using dual connectivity through the MCG over the first radio interface with the wireless terminal and through the SCG over the second radio interface with the wireless terminal, wherein the wireless terminal is configured to use the SCG over the second radio interface for the split SRB without using the MCG over the first radio interface for the split SRB; receiving (803) a scheduling request from the wireless terminal UE at the first network node through the MCG over the first radio interface while the split signaling radio bearer is configured for the wireless terminal; and responsive to receiving the scheduling request, determining (805) that the SCG over the second radio interface with the wireless terminal has failed.

28. The method of Embodiment 27, wherein the wireless terminal is configured only for uplink transmission using the SCG over the second radio interface.

29. The method of any of Embodiments 27-28, wherein the scheduling request includes an indication that the scheduling request is for high priority SRB1 data.

30. The method of any of Embodiments 27-29 wherein the scheduling request is associated with the split SRB.

31. A method of operating a first network node (600*a*), wherein the first network node is configured to operate in cooperation with a second network node (600*b*) to provide dual connectivity, DC, communication with a wireless terminal (500) so that the first network node (600*a*) operates as a master node using a master cell group, MCG, over a first radio interface between the first network node and the wireless terminal and so that the second network node (600*b*) operates as a secondary node using a secondary cell group, SCG, over a second radio interface between the secondary node and the wireless terminal, the method comprising: configuring (901) a split signaling radio bearer, SRB, for the wireless terminal using dual connectivity through the MCG over the first radio interface with the wireless terminal and through the SCG over the second radio interface with the wireless terminal, wherein the wireless terminal is configured to use the SCG over the second radio interface for the split SRB without using the MCG over the first radio interface for the split SRB; receiving (903) a medium access control MAC Control Element CE from the wireless terminal indicating failure of the SCG with the wireless terminal; and responsive to receiving the MAC CE, determining (905) that the SCG over the second radio interface with the wireless terminal has failed.

32. A method of operating a first network node (600*a*), wherein the first network node is configured to operate in cooperation with a second network node (600*b*) to provide dual connectivity, DC, communication with a wireless terminal (500) so that the first network node operates as a master node using a master cell group, MCG, over a first radio interface between the first network node and the wireless terminal and so that the second network node operates as a secondary node using a secondary cell group, SCG, over a second radio interface between the secondary node and the wireless terminal, the method comprising: configuring (1001) a split signaling radio bearer, SRB, for the wireless terminal using dual connectivity through the MCG over the first radio interface with the wireless terminal and through the SCG over the second radio interface with the wireless terminal, wherein the wireless terminal is configured to use the SCG over the second radio interface for the split SRB without using the MCG over the first radio interface for the split SRB; receiving (1003) an SCG failure indication message from the second network node wherein the SCG failure indication message indicates failure of the SCG with the wireless terminal; and responsive to receiving the SCG failure indication, determining (1005) that the SCG over the second radio interface with the wireless terminal has failed.

33. The method of any of Embodiments 27-32 further comprising: responsive to determining that the SCG between the second network node and the wireless terminal has failed, prioritizing (1007) scheduling for the wireless terminal relative to other wireless terminals.

34. The method of any of Embodiments 27-33 further comprising: responsive to determining that the SCG between the second network node and the wireless terminal has failed, increasing (1007) an uplink grant size for the wireless terminal.

35. The method of any of Embodiments 27-34 further comprising: responsive to determining that the SCG between the second network node and the wireless terminal has failed, suspending (1007) downlink transmissions of the split SRB through the second network node and the SCG to the wireless terminal.

36. The method of any of Embodiments 27-35 further comprising: responsive to determining that the SCG between the second network node and the wireless terminal has failed, suspending (1007) downlink transmissions of all split SRBs and/or all split DRBs through the second network node and the SCG to the wireless terminal.

37. The method of any of Embodiments 27-36 further comprising: responsive to determining that the SCG between the second network node and the wireless terminal has failed, changing (1007) a bearer type of all SCG data radio bearers, DRBs, to SCG split DRBs and/or MCG split DRBs and/or MCG DRBs.

38. The method of Embodiment 37 further comprising: responsive to determining that the SCG between the second network node and the wireless terminal has failed, transmitting (1007) an RRC Connection Reconfiguration message through the MCG over the first radio link to the wireless terminal to communicate that all the SCG DRBs are changed to the SCG split DRBs and/or the MCG split DRBs and/or the MCG DRBs.

39. The method of any of Embodiments 27-38 further comprising: responsive to determining that the SCG between the second network node and the wireless terminal has failed, changing (1007) a bearer type of all MCG split data radio bearers, DRBs, to MCG DRBs.

40. The method of any of Embodiments 27-39 further comprising: responsive to determining that the SCG between the second network node and the wireless terminal has failed, changing (1007) a bearer type of all MCG split signaling radio bearers, SRBs, to MCG SRBs.

41. The method of any of Embodiments 27-40 further comprising: responsive to determining that the SCG between the second network node and the wireless terminal has failed, changing (1007) a bearer type of all SCG split data radio bearers, DRBs, to MCG DRBs.

42. The method of any of Embodiments 39-41 further comprising: responsive to determining that the SCG between the second network node and the wireless terminal has failed, transmitting (1007) an RRC Connection Reconfiguration message through the MCG over the first radio link to the wireless terminal to communicate changing the bearer type.

43. The method of any of Embodiments 27-42 further comprising: receiving (1007) an uplink transmission from the wireless terminal using an MCG data radio bearer, DRB, wherein the uplink transmission includes embedded data of an SCG DRB; and responsive to receiving the uplink transmission, transmitting (1007) the embedded data of the SCG DRB over a network interface to the second network node.

44. The method of any of Embodiments 27-43 further comprising: receiving (1007) an uplink transmission from the wireless terminal using an MCG signaling radio bearer, SRB, wherein the uplink transmission includes embedded data of an SCG SRB; and transmitting (1007) the embedded data of the SCG SRB over a network interface to the second network node.

45. The method of any of Embodiments 27-32 further comprising: responsive to determining that the SCG between the second network node and the wireless terminal has failed, releasing (1007) the second network node as a secondary node with respect to the wireless terminal.

46. The method of Embodiments 45 further comprising: responsive to determining that the SCG between the second network node and the wireless terminal has failed, adding (1007) a third network node as a secondary node with respect to the wireless terminal.

47. The method of any of Embodiments 43-46 further comprising: responsive to determining that the SCG between the second network node and the wireless terminal has failed, transmitting (1007) an RRC Connection Reconfiguration message through the MCG over the first radio link to the wireless terminal to communicate that the second network node has been released and that the third network node has been added as a secondary node with respect to the wireless terminal.

48. The method of any of Embodiments 27-47, wherein the split SRB is a split first signaling radio bearer, SRB1.

49. A method of operating a first network node (600a), wherein the first network node is configured to operate in cooperation with a second network node (600b) to provide dual connectivity, DC, communication with a wireless terminal (500) so that the first network node operates as a master node using a master cell group, MCG, over a first radio interface between the first network node and the wireless terminal and so that the second network node operates as a secondary node using a secondary cell group, SCG, over a second radio interface between the secondary node and the wireless terminal, the method comprising: receiving (1101) an uplink transmission from the wireless terminal using an MCG data radio bearer, DRB, wherein the uplink transmission includes embedded data of an SCG DRB; and responsive to receiving the uplink transmission, transmitting (1103) the embedded data of the SCG DRB over a network interface to the second network node.

50. A method of operating a first network node (600a), wherein the first network node is configured to operate in cooperation with a second network node (600b) to provide dual connectivity, DC, communication with a wireless terminal (500) so that the first network node operates as a master node using a master cell group, MCG, over a first radio interface between the first network node and the wireless terminal and so that the second network node operates as a secondary node using a secondary cell group, SCG, over a second radio interface between the secondary node and the wireless terminal, the method comprising: receiving (1201) an uplink transmission from the wireless terminal using an MCG signaling radio bearer, SRB, wherein the uplink transmission includes embedded data of an SCG SRB; and responsive to receiving the uplink transmission, transmitting (1203) the embedded data of the SCG SRB over a network interface to the second network node.

51. A method of operating a second network node (600b), wherein the second network node is configured to operate in cooperation with a first network node (600b) to provide dual connectivity, DC, communication with a wireless terminal (500) so that the first network node operates as a master node using a master cell group, MCG, over a first radio interface between the first network node and the wireless terminal and so that the second network node operates as a secondary node using a secondary cell group, SCG, over a second radio interface between the secondary node and the wireless terminal, the method comprising: detecting (1301) at the second network node SCG failure between the second network node and the wireless terminal; and responsive to detecting SCG failure, transmitting (1303) a failure information report from the second network node over a network interface to the first network node.

52. The method of Embodiment 51, wherein the failure information report includes an identity of the wireless terminal.

53. The method of any of Embodiments 27-52, wherein the first network node is an LTE base station and the second network node is an NR base station, or wherein the first network node is an NR base station and the second network node is an LTE base station.

54. A network node comprising: a transceiver (601) configured to provide wireless network communication with a wireless terminal; a network interface (607) configured to provide network communication with other network nodes; and a processor (603) coupled with the transceiver and the network interface, wherein the processor is configured to provide communication with the wireless terminal through the transceiver, wherein the processor is configured to provide communication with the other network nodes through the network interface, and wherein the processor is configured to perform operations according to any of Embodiments 27-53.

55. The network node of Embodiment 54, wherein the network interface is an X2 network interface.

56. A network node, wherein the network node is adapted to perform operations according to any of Embodiments 27-53.

57. A network node, wherein the network node includes modules configured to perform operations according to any of Embodiments 27-53.

58. The method of any of Embodiments 1-22, wherein the master node is an LTE base station and the secondary node is an NR base station, or wherein the master node is an NR base station and the secondary node is an LTE base station.

Additional wireless terminal UE embodiments are discussed below.

Embodiment 1

Upon SCG failure, a UE that has been configured to use only the SCG leg for SRB1, will use any available UL grant on the MCG leg to send the SCGFailureInformation to the MCG.

Embodiment 1a

The grant used for the SCGFailureInformation according to Embodiment 1 is a grant that was received for a scheduling request that was sent out earlier by the UE to send data belonging to a DRB(s). In this case, the UE may prioritize CP data over UP data.

Embodiment 1b

The grant used for the SCGFailureInformation according to Embodiment 1 is a grant that was received for a scheduling request that was sent out earlier by the UE to send data belonging to SRB2.

Embodiment 2

Upon SCG failure, a UE that has been configured to use only the SCG leg for SRB1, upon finding that there is no available UL grant on the MCG leg to send the SCGFailureInformation to the MCG, will send a scheduling request to the MN.

Embodiment 2a

A flag is included in the scheduling request indicating that this if for high priority (SRB1) data.

Embodiment 3

Upon the reception of the grant as a result of the scheduling request sent according to Embodiment 2, the UE will send the SCGFailureInformation to the MN.

Embodiment 4

The SCGFailureInformation message can be sent multiplexed with any other pending data (SRB or DRB data), if the available or provided grant is sufficient enough to do so.

Embodiment 4a

The other data being multiplexed with the SCGFailureInformation according to embodiment 4 belongs to a split SRB2 that is configured to use the MCG, SCG or both paths in the UL.

Embodiment 4b

The other data being multiplexed with the SCGFailureInformation according to embodiment 4 belongs to a split DRB that is configured to use the MCG, SCG or both paths in the UL.

Embodiment 4c

The other data being multiplexed with the SCGFailureInformation according to embodiment 4 belongs to an SCG DRB.

Embodiment 4d

The other data being multiplexed with the SCGFailureInformation according to embodiment 4 belongs to an MCG DRB.

Embodiment 5

After or upon the sending of the SCGFailureInformation according to embodiments 1-4, the UE also switches the UL path of any split DRB/SRB2 to the MCG path.

Embodiment 6

After or up on the sending of the SCGFailureInformation according to embodiments 1-4, the UE deactivates DC level duplication on any split DRB or split SRB2.

Embodiment 7

After or up on the sending of the SCGFailureInformation according to embodiments 1-4, the UE associates UL SCG DRB to the MCG leg.

Embodiment 7a

The association of UL SCG DRB to the MCG leg according to embodiment 7 is accomplished by including the SCG DRB data embedded inside an MCG (split or non split) DRB data. An indicator is introduced in the PDCP header to indicate that there is an embedded SCG DRB data and where this data begins in the PDCP data packet.

Embodiment 8

After or up on the sending of the SCGFailureInformation according to embodiments 1-4, the UE starts sending all NR RRC messages via embedded RRC messages via MCG, even though it was configured with SCG SRB.

Embodiment 9

Upon SCG failure, a UE that has been configured to use only the SCG leg for SRB1, will use SRB2 to send the SCGFailureInformation message to the MN, if SRB2 was not also configured to use only the SCG path.

Embodiment 10

Upon SCG failure, a UE that has been configured to use only the SCG leg for SRB1, will indicate the SCG Failure by sending a new MAC CE indicating so towards the MCG.
Additional network node embodiments are discussed below.

Embodiment 11

The SN performs the SCG Failure detection (e.g. SN may assume that that the SCG leg has failed/is about to fail if it detects that the SRS signal quality/strength becomes much lower than a certain expected threshold, (N)ACKs anticipated from the UE are not received on time, etc.).

Embodiment 12

Upon detecting the SCG Failure according to embodiment 11, the SN sends a failure information report to the MN, including the identity of the UE for which the SCG has failed.

Embodiment 13

If the MN receives a scheduling request, and if the requesting UE was not configured to use the MCG path in the UL for anything (i.e. split SRB configured with path set to the SCG, and possibly only SCG DRBs or all the MCG/SCG split bearers were also configured to use the SCG path); or
the MN receives a scheduling request that indicates the request is for high priority SRB1 data, while SRB1 was configured as split bearer and the UE was configured to use only the SCG path in the UL; or
the MN receives a MAC CE from the UE indicating an SCG Failure; or
the MN receives an SCG failure indication from the SN
then the network takes this as an indication that the SCG of the UE has failed Embodiment 14: Upon detecting SCG failure either according to embodiments 13, if the MN has radio resource limitations in the DL, it prioritizes the scheduling of the UE over other UEs.

Embodiment 15

Upon detecting SCG failure either according to embodiments 13, the MN gives the UE a bigger grant than it normally does by default. This will enable the UE to send not only the SCGFailureInformation, but also the data for any other DRB or SRB2 that was originally configured to use only the SCG path.

Embodiment 16

Upon detecting SCG failure either according to embodiments 13, the MN immediately suspends the DL transmission on the SCG path for all the bearers Embodiment 17

Upon detecting SCG failure either according to embodiments 13, the MN changes the bearer type of all SCG DRBs to SCG split DRB or just MCG DRB.

Embodiment 17a

The MN sends an RRCConnectionReconfiguration message to the UE to communicate the bearer type modification according to embodiment 17.

Embodiment 18

Upon detecting SCG failure either according to embodiments 13, the MN releases the current SCG/SN.

Embodiment 19

Upon detecting SCG failure either according to embodiments 13, the MN configures the UE to use a new SN/SCG.

Embodiment 20

Upon receiving a data belonging to an SCG DRB embedded in another DRB from the UE, the MN extracts the embedded DRB data and forwards it to the SN.

Embodiment 21

Upon receiving a data belonging to an SCG SRB embedded in an MCG SRB from the UE, the MN extracts the embedded SRB data and forwards it to the SN. Explanations are provided below for abbreviations used in the present disclosure.

| Abbreviation | Explanation |
| --- | --- |
| ACK | Acknowledgement |
| AP | Application Protocol |
| BSR | Buffer Status Report |
| CE | Control Element |
| CP | Control Plane |
| CU | Central Unit |
| DC | Dual Connectivity |
| DCI | Downlink Control Information |
| DL | Downlink |
| DRB | Data Radio Bearer |
| DU | Decentralized Unit |
| eNB | evolved NodeB (LTE base station) or EUTRAN base station |
| E-RAB | EUTRAN Radio Access Bearer |
| E-UTRAN | Evolved Universal Terrestrial Radio Access Network |
| F1 | interface between CU and DU |
| FDD | Frequency Division Duplex |
| gNB | NR base station |
| GTP-U | GPRS Tunneling Protocol - User Plane |
| HARQ | Hybrid automatic repeat request (ARQ) |
| IP | Internet Protocol |

-continued

| Abbreviation | Explanation |
| --- | --- |
| LTE | Long Term Evolution |
| MCG | Master Cell Group |
| MAC | Medium Access Control |
| MeNB | Master eNB |
| MgNB | Master gNB |
| MN | Master Node |
| NACK | Negative Acknowledgment |
| NR | New Radio |
| PCell | Primary Cell |
| PDCP | Packet Data Convergence Protocol |
| PDU | Protocol Data Unit |
| PHY | Physical |
| PSCell | Primary Secondary Cell |
| PUSCH | Physical Uplink Shared Channel |
| RAT | Radio Access Technology |
| RF | Radio Frequency |
| RLC | Radio Link Control |
| RLF | Radio Link Failure |
| RRC | Radio Resource Control |
| Rx | Receiver |
| SCG | Secondary Cell Group |
| SCTP | Stream Control Transmission Protocol |
| SeNB | Secondary eNB |
| SN | Secondary Node |
| SR | Scheduling Request |
| SRB | Signaling Radio Bearer |
| TCP | Transmission Control Protocol |
| TDD | Time Division Duplex |
| TEID | Tunnel Endpoint IDentifier |
| TNL | Transport Network Layer |
| Tx | Transmitter |
| UCI | Uplink Control Information |
| UDP | User Datagram Protocol |
| UE | User Equipment |
| UL | Uplink |
| UP | User Plane |
| URLLC | Ultra Reliable Low Latency Communication |
| X2 | Interface between base stations |
| X2-AP | X2 Application Protocol |

Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method of operating a wireless terminal providing dual connectivity, DC, communication through a master node using a master cell group, MCG, over a first radio interface between the wireless terminal and the master node and through a secondary node using a secondary cell group, SCG, over a second radio interface between the wireless terminal and the secondary node, the method comprising:
    configuring a split signaling radio bearer, SRB, for the wireless terminal using dual connectivity through the MCG over the first radio interface with the master node and through the SCG over the second radio interface with the secondary node, wherein the wireless terminal is configured to use the SCG over the second radio interface for the split SRB without using the MCG over the first radio interface for the split SRB; and
    responsive to detecting failure of the SCG over the second radio interface while configured to use the SCG over the second radio interface for the split SRB without using the MCG over the first radio interface for the split SRB, transmitting an SCG failure information message regarding failure of the SCG to the master node using the MCG.

2. The method of claim 1, wherein transmitting the SCG failure information message comprises transmitting the SCG failure information message using uplink resources defined by an uplink grant from the master node, and wherein the uplink grant from the master node is an uplink grant for the MCG, the method further comprising:
    before detecting failure of the SCG, transmitting a scheduling request, SR, to the master node; and
    receiving the uplink grant for the MCG from the master node, wherein the uplink grant corresponds to the scheduling request, SR.

3. The method of claim 1, wherein transmitting the SCG failure information message comprises transmitting the SCG failure information message using uplink resources defined by an uplink grant from the master node, the method further comprising:

responsive to detecting failure of the SCG over the second radio interface while configured to use the SCG over the second radio interface for the split SRB without using the MCG over the first radio interface for the split SRB, transmitting a scheduling request, SR, to the master node, wherein the scheduling request includes an indication that the scheduling request is for high priority SRB1 data; and receiving the uplink grant for the MCG from the master node, wherein the uplink grant corresponds to the scheduling request.

4. The method of claim 1, further comprising:
responsive to detecting failure of the SCG over the second radio interface, switching an uplink path of a split data radio bearer, DRB, and/or a split signaling radio bearer, SRB, to use only the MCG over the first radio interface.

5. The method of claim 1, further comprising:
responsive to detecting failure of the SCG over the second radio interface, deactivating DC duplication on any split data radio bearer, DRB, and/or signaling radio bearer, SRB.

6. The method of claim 1, wherein the split SRB is a split first signaling radio bearer, SRB1.

7. A method of operating a first network node, wherein the first network node is configured to operate in cooperation with a second network node to provide dual connectivity, DC, communication with a wireless terminal so that the first network node operates as a master node using a master cell group, MCG, over a first radio interface between the first network node and the wireless terminal and so that the second network node operates as a secondary node using a secondary cell group, SCG, over a second radio interface between the secondary node and the wireless terminal, the method comprising:

configuring a split signaling radio bearer, SRB, for the wireless terminal using dual connectivity through the MCG over the first radio interface with the wireless terminal and through the SCG over the second radio interface with the wireless terminal, wherein the wireless terminal is configured to use the SCG over the second radio interface for the split SRB without using the MCG over the first radio interface for the split SRB;

receiving an SCG failure indication message from the second network node wherein the SCG failure indication message indicates failure of the SCG with the wireless terminal; and responsive to receiving the SCG failure indication, determining that the SCG over the second radio interface with the wireless terminal has failed.

8. The method of claim 7 further comprising:
responsive to determining that the SCG between the second network node and the wireless terminal has failed, prioritizing scheduling for the wireless terminal relative to other wireless terminals.

9. The method of claim 7 further comprising:
responsive to determining that the SCG between the second network node and the wireless terminal has failed, suspending downlink transmissions of the split SRB through the second network node and the SCG to the wireless terminal.

10. The method of claim 7 further comprising:
responsive to determining that the SCG between the second network node and the wireless terminal has failed, suspending downlink transmissions of all split SRBs and/or all split DRBs through the second network node and the SCG to the wireless terminal.

11. The method of claim 7 further comprising at least one of:

responsive to determining that the SCG between the second network node and the wireless terminal has failed, changing a bearer type of all SCG data radio bearers, DRBs, to SCG split DRBs and/or MCG split DRBs and/or MCG DRBs;

responsive to determining that the SCG between the second network node and the wireless terminal has failed, changing a bearer type of all MCG split data radio bearers, DRBs, to MCG DRBs;

responsive to determining that the SCG between the second network node and the wireless terminal has failed, changing a bearer type of all MCG split signaling radio bearers, SRBs, to MCG SRBs; and/or responsive to determining that the SCG between the second network node and the wireless terminal has failed, changing a bearer type of all SCG split data radio bearers, DRBs, to MCG DRBs.

12. A wireless terminal comprising:
a transceiver configured to provide wireless communication in a wireless communication network; and
a processor coupled with the transceiver, wherein the processor is configured to provide wireless network communication through the transceiver, wherein the processor is configured to provide dual connectivity, DC, communication through a master node using a master cell group, MCG, over a first radio interface between the wireless terminal and the master node and through a secondary node using a secondary cell group, SCG, over a second radio interface between the wireless terminal and the secondary node, and wherein the processor is configured to, configure a split signaling radio bearer, SRB, for the wireless terminal using dual connectivity through the MCG over the first radio interface with the master node and through the SCG over the second radio interface with the secondary node, wherein the wireless terminal is configured to use the SCG over the second radio interface for the split SRB without using the MCG over the first radio interface for the split SRB, and transmit an SCG failure information message regarding failure of the SCG to the master node using the MCG responsive to detecting failure of the SCG over the second radio interface while configured to use the SCG over the second radio interface for the split SRB without using the MCG over the first radio interface for the split SRB.

13. The wireless terminal of claim 12, wherein transmitting the SCG failure information message comprises transmitting the SCG failure information message using uplink resources defined by an uplink grant from the master node, and wherein the uplink grant from the master node is an uplink grant for the MCG, and wherein the processor is further configured to, transmit a scheduling request, SR, to the master node before detecting failure of the SCG, and receive the uplink grant for the MCG from the master node, wherein the uplink grant corresponds to the scheduling request, SR.

14. The wireless terminal of claim 13, wherein transmitting the SCG failure information message comprises transmitting the SCG failure information message using uplink resources defined by an uplink grant from the master node, and wherein the processor is further configured to,
    transmit a scheduling request, SR, to the master node responsive to detecting failure of the SCG over the second radio interface while configured to use the SCG over the second radio interface for the split SRB without using the MCG over the first radio interface for the split SRB, wherein the scheduling request includes an indication that the scheduling request is for high priority SRB1 data, and
    receive the uplink grant for the MCG from the master node, wherein the uplink grant corresponds to the scheduling request.

15. The wireless terminal of claim 12, wherein the processor is further configured to,
    switch an uplink path of a split data radio bearer, DRB, and/or a split signaling radio bearer, SRB, to use only the MCG over the first radio interface responsive to detecting failure of the SCG over the second radio interface.

16. The wireless terminal of claim 12, wherein the processor is further configured to,
    deactivate DC duplication on any split data radio bearer, DRB, and/or signaling radio bearer, SRB responsive to detecting failure of the SCG over the second radio interface.

17. The wireless terminal of claim 12, wherein the split SRB is a split first signaling radio bearer, SRB1.

18. A first network node comprising:
    a transceiver configured to provide wireless network communication with a wireless terminal;
    a network interface configured to provide network communication with other network nodes; and
    a processor coupled with the transceiver and the network interface, wherein the processor is configured to provide communication with the wireless terminal through the transceiver, wherein the processor is configured to provide communication with the other network nodes through the network interface, wherein the processor is configured to operate in cooperation with a second network node to provide dual connectivity, DC, communication with a wireless terminal so that the first network node operates as a master node using a master cell group, MCG, over a first radio interface between the first network node and the wireless terminal and so that the second network node operates as a secondary node using a secondary cell group, SCG, over a second radio interface between the secondary node and the wireless terminal, and wherein the processor is configured to,
        configure a split signaling radio bearer, SRB, for the wireless terminal using dual connectivity through the MCG over the first radio interface with the wireless terminal and through the SCG over the second radio interface with the wireless terminal, wherein the wireless terminal is configured to use the SCG over the second radio interface for the split SRB without using the MCG over the first radio interface for the split SRB,
        receive an SCG failure indication message from the second network node wherein the SCG failure indication message indicates failure of the SCG with the wireless terminal, and
        determine that the SCG over the second radio interface with the wireless terminal has failed responsive to receiving the SCG failure indication.

19. The first network node of claim 18, wherein the processor is further configured to,
    prioritize scheduling for the wireless terminal relative to other wireless terminals responsive to determining that the SCG between the second network node and the wireless terminal has failed.

20. The first network node of claim 18, wherein the processor is further configured to,
    suspend downlink transmissions of the split SRB through the second network node and the SCG to the wireless terminal responsive to determining that the SCG between the second network node and the wireless terminal has failed.

21. The first network node of claim 18, wherein the processor is further configured to,
    suspend downlink transmissions of all split SRBs and/or all split DRBs through the second network node and the SCG to the wireless terminal responsive to determining that the SCG between the second network node and the wireless terminal has failed.

22. The first network node of claim 18, wherein the processor is further configured to,
    change a bearer type of all SCG data radio bearers, DRBs, to SCG split DRBs and/or MCG split DRBs and/or MCG DRBs responsive to determining that the SCG between the second network node and the wireless terminal has failed,
    change a bearer type of all MCG split data radio bearers, DRBs, to MCG DRBs responsive to determining that the SCG between the second network node and the wireless terminal has failed,
    change a bearer type of all MCG split signaling radio bearers, SRBs, to MCG SRBs responsive to determining that the SCG between the second network node and the wireless terminal has failed, and/or
    change a bearer type of all SCG split data radio bearers, DRBs, to MCG DRBs responsive to determining that the SCG between the second network node and the wireless terminal has failed.

* * * * *